United States Patent
Gugel et al.

(10) Patent No.: US 6,513,085 B1
(45) Date of Patent: *Jan. 28, 2003

(54) LINK/TRANSACTION LAYER CONTROLLER WITH INTEGRAL MICROCONTROLLER EMULATION

(75) Inventors: Robert G. Gugel, Garland, TX (US); Merril R. Newman, Schaumburg, IL (US); Burke S. Henehan, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/417,453

(22) Filed: Oct. 13, 1999

Related U.S. Application Data

(60) Provisional application No. 60/103,937, filed on Oct. 13, 1998.

(51) Int. Cl.[7] .............................. G06F 13/00; H04J 3/00
(52) U.S. Cl. ........................ 710/305; 710/52; 703/23; 370/438
(58) Field of Search ................................ 710/305, 100, 710/52, 106; 709/200, 238; 711/109; 370/429, 438, 235, 912; 340/825.52; 703/27, 28, 23

(56) References Cited

U.S. PATENT DOCUMENTS

| | | | |
|---|---|---|---|
| 5,991,520 A | * | 11/1999 | Smyers et al. |
| 6,138,196 A | * | 10/2000 | Takayama et al. |
| 6,157,972 A | * | 12/2000 | Newman et al. |
| 6,272,499 B1 | * | 8/2001 | Wooten |
| 6,327,637 B1 | * | 12/2001 | Chang |
| 6,347,097 B1 | * | 2/2002 | Deng |

* cited by examiner

*Primary Examiner*—Gopal C. Ray
(74) *Attorney, Agent, or Firm*—Wade James Brady, III; Frederick J. Telecky, Jr.

(57) ABSTRACT

An IEEE 1394 serial bus (58) is interfaced utilizing a physical layer (54) to extract the data and a link/transaction layer controller (200) to interface the data from the physical layer (54) to a host system. The host system consists of a peripheral device (210) which is interfaced with various host buses (202). The link/transaction layer controller (200) is operable to emulate the microcontroller function such that addresses can be transmitted to the peripheral device (210) along with data, such that a remote node can access the peripheral device (210) by transmitting address and data information thereto. Alternatively, address and data information can be transmitted from the peripheral device (210) to the controller (200) which will process the received address and data and transmit it to a remote node.

16 Claims, 12 Drawing Sheets

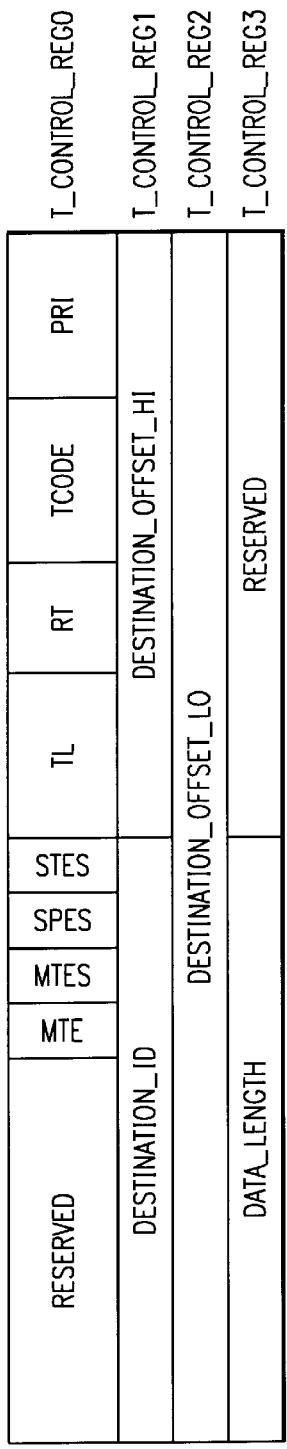
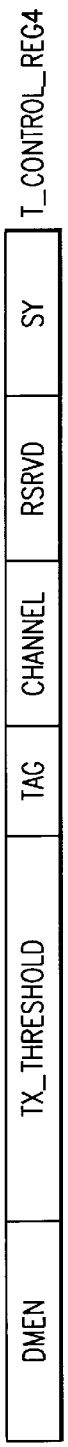
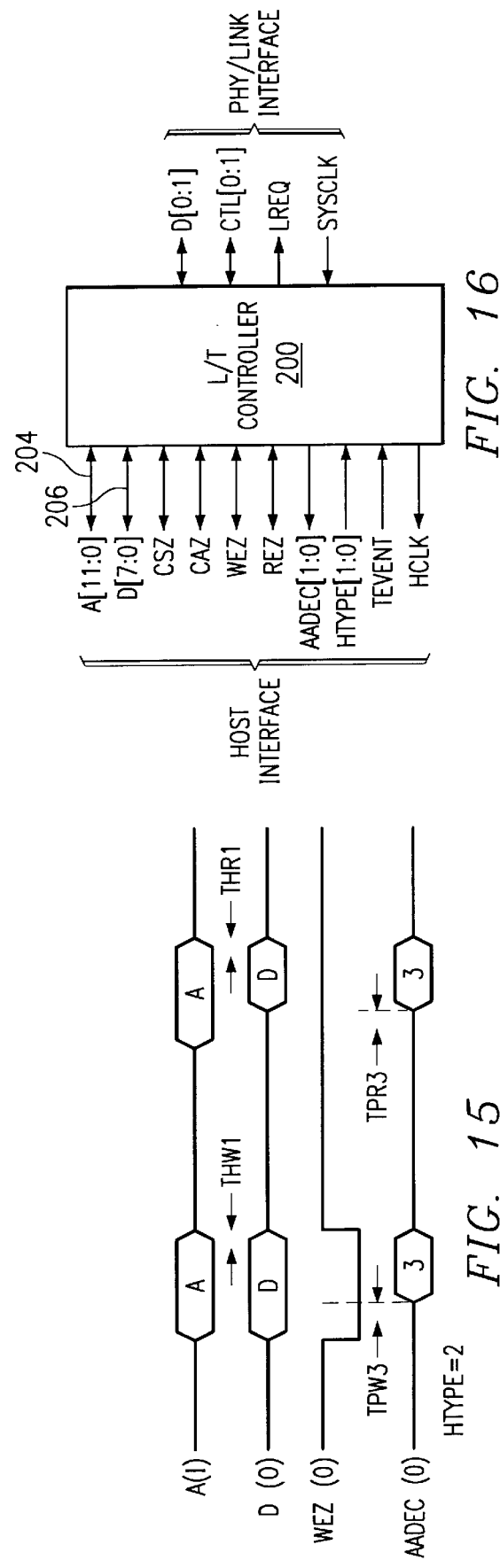
FIG. 14
FIG. 15
FIG. 16

LINK/TRANSACTION LAYER CONTROLLER WITH INTEGRAL MICROCONTROLLER EMULATION

CROSS REFERENCE TO PRIOR APPLICATIONS

This application claims priority under 35 U.S.C. 119(e) based upon Provisional Application Ser. No. 60/103,937, filed Oct. 13, 1998.

TECHNICAL FIELD OF THE INVENTION

The present invention pertains in general to receiving data from a serial bus of the IEEE 1394 type and, more particularly, to interfacing that data to a peripheral unit in a host system without the requirement for a separate microcontroller.

BACKGROUND OF THE INVENTION

The IEEE has approved a new standard under IEEE 1394 for a high-performance serial bus cable environment that includes a network of logical nodes connected by point-to-point links called physical connections. The physical connections consist of a port on each of the nodes and a cable disposed therebetween. A node can have multiple ports, which allows a branching multi-hop interconnect. The limitations on this topology are set by the requirement for the fixed round-trip time required for the arbitration protocol. The default timing set after a bus reset is adequate for 16 cable hops, each of 4.5 meters for a total of 72 meters. The maximum number of nodes supported on a single bus is 63.

Whenever a node is added to or removed from the 1394 serial bus, a bus reset occurs and forces all nodes to a known state. After a bus reset, the tree identify (ID) process translates the general network topology into a tree, where one node is designated a root, and all the physical connections are labeled as either a parent, a child or as unconnected. The unconnected ports are labeled as "off" and do not participate any further. The tree must be acyclic, meaning no loops allowed; otherwise, the tree ID process will not be completed.

The 1394 cable environment supports multiple data rates of 98.304, 196.608, 393.216 megabits per second. The lowest speed is known as the base rate, and all ports that support a higher data rate must also support the lower data rate. Nodes capable of data rates greater than the base rate exchange speed information with its peers through its attach ports during the speed signaling phase of normal bus arbitration. If a peer node is incapable of receiving high-speed data, then data will not propagate down that path. Data will only be propagated down paths that support the higher data rate.

During data packet transmission, the source node sends a speed code, format and transaction codes, addresses of the source and destination nodes and data in a packet form. The destination field in this packet is utilized by each node's link layer to determine if it is the recipient of the transmitted data. The maximum speed at which a data packet can be transmitted depends upon the bus topology and the data transmission speed supported by the nodes on the bus. To determine the optimum speed at which a data packet may be sent, the maximum supported speeds of the transmitting and receiving nodes, as well as the maximum speeds of any nodes connected between these nodes, must be determined. The optimum speed for data transmission is equal to the highest speed which is supported by all the nodes, which are required to participate in the transmission of the data packet.

The IEEE 1394 bus typically requires a physical layer for extracting information from the bus at a transaction/link layer for interfacing the extracted data from the bus to a host system. The host system typically comprises a host bus and a CPU. The CPU is generally given the task of extracting information from a FIFO in which data from the bus is stored. This data, after being fetched by the CPU, is then transmitted to the appropriate peripheral unit or utilized in various processing operations by the CPU. The CPU can also send information to the serial bus by first storing it in the FIFO and then providing instructions to the link/transaction layer to retrieve the information from the FIFO and transmit it to the serial bus. However, due to the fact that a separate CPU or microcontroller is required, this makes the IEEE1394 bus less attractive for small applications such as digital microphones, stereo receivers and transmitters, etc.

SUMMARY OF THE INVENTION

The present invention disclosed and claimed herein comprises a serial bus interface disposed on a local node for interfacing between a serial bus and a host system and for receiving information from the serial bus placed thereon by a remote node, and transferring this received data to the host system, and receiving information from the host system and transferring the received information to the serial bus for reception by the remote node. The interface includes a data receiver for receiving data generated by the remote node from the serial bus, and a data transmitter for transmitting data to the serial bus for receipt at the remote node. A plurality of registers are also provided, at least one of the registers addressable by the remote node for storage of received data therein. The data receiver is operable to store received data in at least one register during a read operation with a transmitter operable to transmit data to the serial bus during a Write operation. A host bus interface is provided to interface directly with a host bus on the host system, the host bus interface operable to transfer data stored in the at least one register to the host bus during a Write operation when the data is received and stored in the at least one register. It is also operable to retrieve data from the host bus during a Read operation.

In another aspect of the present invention the interface includes a standard register space, wherein at least one register occupies a portion of the standard register space. Select ones of the plurality of registers are dedicated to storage of standard bus information and the remote node can directly access this information. The data receiver is operable to recognize a request for access to one of the plurality of registers and the data transmitters are then operable to transmit the contents thereof when addressed. Select ones of the plurality of registers contain configuration registers for storing configuration information therein that define the operation of the serial bus interface. This allows the remote node to program the operation of the serial bus interface by accessing one of the configuration registers.

In a further aspect of the present invention, data is received in data packets and transmitted in data packets. These data packets comprise information necessary to identify the transmitting node on the serial bus and the content of the data packet in addition to information identifying the remote node designated to receive the packet. Each data reception or data transmission operation is proceeded by a data request, a Write request or Read request, respectively, from the remote node, which requests are contained in the received data packet. The received data packet associated with a Write request contains the data associated therewith, which data is stored in at least one register upon receipt thereof. The host interface recognizes Write requests and then transfers the data stored the at least one register to the host bus. During a Read request, the host interface recognizes the Read request and access the data from the host for transfer to remote node with data transfer.

BRIEF DESCRIPTION OF THE DRAWINGS

For a more complete understanding of the present invention and the advantages thereof, reference is now made to the following description taken in conjunction with the accompanying Drawings in which:

FIG. 14 illustrates a diagrammatic view of the control register;

FIG. 15 illustrates a timing diagram for the host CSR access;

FIG. 16 illustrates a diagrammatic view of the pin connections for the link/transaction layer controller;

DETAILED DESCRIPTION OF THE INVENTION

Figure 1:
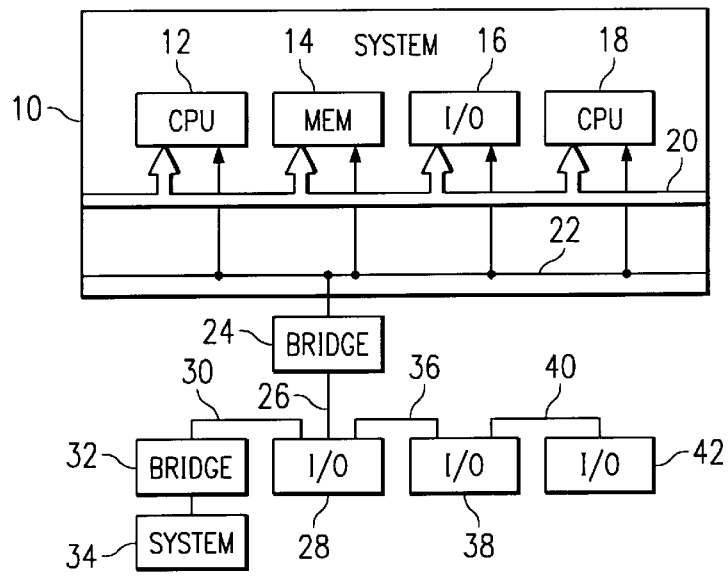
FIG. 1 illustrates an overall block diagram of a system utilizing the IEEE 1394 serial bus architecture.

Referring now to FIG. 1, there is illustrated a block diagram of a system utilizing the serial bus architecture that is defined as the IEEE 1394 serial bus. This is defined in the "IEEE Standard for a High-Performance Serial Bus," IEEE STD 1394-1995, which is incorporated herein by reference. A module 10 is illustrated, which module 10 includes a CPU 12, a memory 14, an input/output (I/O) 16 and a CPU 18. The CPU 12, memory 14, I/O 16 and CPU 18 all comprise units within the system. Each of the units 12–18 interfaces with a parallel bus 20, which is a system bus that is indigenous to the module 10. In addition, each of the units 12–18 interfaces with a serial bus 22 which is referred to as a "backplane." The serial bus 22 operates in accordance with the IEEE 1394 standard and is also interfaced external to the system with a bridge 24. The bridge 24 and the module 10 each comprise logical nodes on the serial bus. In general, the serial bus architecture is defined in terms of logical nodes, the node being an addressable entity. Each of those can be independently reset and identified, and more than one node may reside on a single module, and more than one unit may reside in a single node. A node is therefore a logical addressing concept wherein a module is a physical device which can consist of more than one node that share a physical interface. The address space of a single node can be directly mapped to one or more units. A unit can be a logical entity, such as a disk controller, memory, CPU, etc. Within a given unit, there may be multiple subunits, which can be accessed through independent control registers or uniquely addressed with direct memory access (DMA) command sequences.

Referring further to FIG. 1, it can be seen that there are two environments, one within the module 10 utilizing the backplane 22, referred to as the "backplane environment," and the other being a "cable environment." The nodes interfacing with the cable environment have "ports" associated therewith. The bridge node 24 is such a node which interfaces on one side to the backplane serial bus 22 and on the other side to a cable 26 which interfaces to a single I/O node 28 through one port therein. The I/O node 28 has two other ports, one of which is connected through a cable serial bus 30 to a bridge node 32. The bridge node 32 is similar to the bridge node 24 in that it interfaces with another system 34, this being a module. The system node 34 can be substantially identical to the system 10, or any other type of system employing a backplane. The third port of the I/O node 28 interfaces through a cable serial bus 36 to one port of an I/O node 38, the other port thereof interfaced through a cable serial bus 40 to an I/O node 42.

The cable environment in general is a physical topology that provides a noncyclic network with finite branches and extent. The medium consists of two conductor pairs for signals and one pair for power and ground that connect ports on different nodes. Each port consists of terminators, transceivers, and simple logic. The cable and ports act as bus repeaters between the nodes to simulate a single logical bus. The backplane environment, by comparison, comprises a multidrop bus. This consists of two single-ended conductors running the length of the backplane in the module. Connectors distributed along the bus allow nodes to "plug into" the bus. This system makes use of wired-OR logic that allows all nodes to assert the bus.

Figure 2:
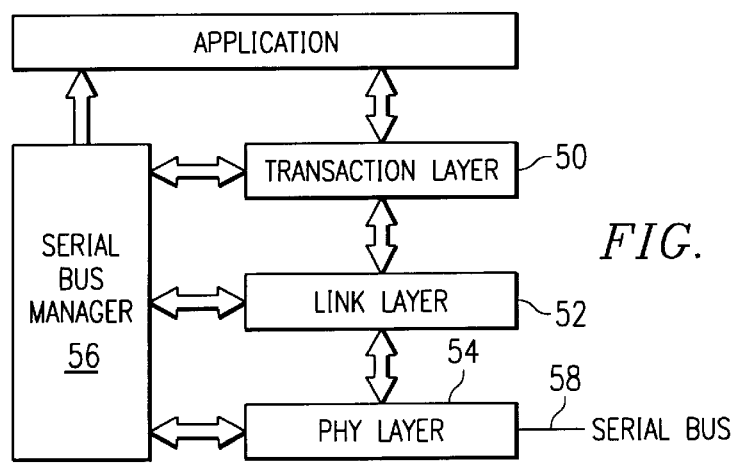
FIG. 2 illustrates a simplified block diagram of the various protocol layers in the IEEE 1394 bus.

Referring now to FIG. 2, there is illustrated a block diagram of the serial bus protocol. The serial bus protocol is comprised of three stack layers, a transaction layer 50, a link layer 52 and a physical layer 54 labeled "PHY." The transaction layer defines a complete response-response protocol to perform the bus transactions required to support the CSR architecture (control and status registers). This provides operations of read, write and lock. The link layer 52 provides an acknowledge datagram (a one-way data transfer with confirmation of request) service to the transaction layer 50. It provides addressing, data checking, and data framing for packet transmission and reception. The link layer 52 also provides an isochronous data transfer service directly to the application, including the generation of a "cycle" signal utilized for timing and synchronization. One link layer transfer is called a "subaction."

The physical layer 54 provides three major functions. It translates the logical symbols utilized by the link layer 52 into electrical signals on the different serial bus media. It guarantees that only one node at a time is sending data over the bus by providing an arbitration service. It also defines the mechanical interfaces for the serial bus. For each environment, there is provided a different physical layer, the cable and backplane environments. The cable physical layer also provides a data resynch and repeat service and automatic bus initialization.

In addition to the three layers, there is also provided a serial bus management block 56 that provides the basic control functions and standard CSRs needed to control nodes or to manage bus resources. This includes a number of components, a bus manager component which is only active at a single node that exercises management responsibilities over an entire bus, a node controller component, and an isochronous resource manager that centralizes the services needed to allocate data with another isochronous resource. An isochronous resource is a resource having the characteristics of a time-scale or signal that has time intervals between consecutive significant instances with either the same duration or durations that are integral multiples of the shortest duration. For the purposes of the present invention, the physical layer interfacing with the serial bus 58 and the link layer 52 will be interfaced with a receive buffer (not shown).

Figure 3:
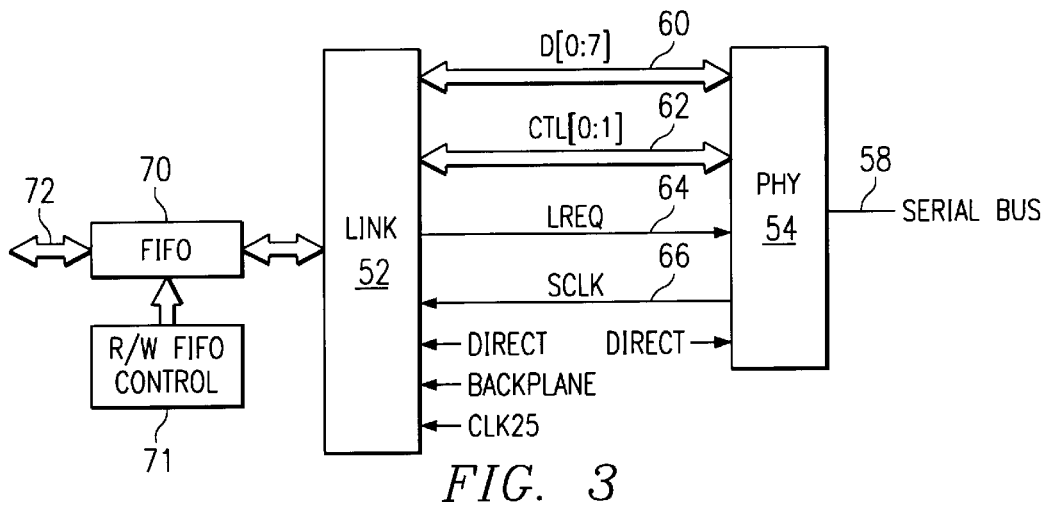
FIG. 3 illustrates a more detailed block diagram of the physical and link layers which interface with the FIFO.

Referring now to FIG. 3, there is illustrated a block diagram of the interface between the physical layer 54 and the link layer 52. The physical layer 54 interfaces with the serial bus 58 and is operable to receive data therefrom. Data is passed to and from the link layer 52 through an 8-bit bi-directional data bus 60. Two control bits are passed between the physical layer 54 and the link layer 52 over a control bus 62. A link request is transferred to the physical 54 from the link layer 52 through a request line 64, but with a system clock signal, SCLK, transferred from the physical layer 54 to the link layer 52, the physical layer 54 recovering this clock.

Hereinafter, data rates are referred to in multiples of 98.304 Mbit/s. The interface provided in the IEEE 1394 in the cable environment will support the following data rates: 100 Mbit/s, 200 Mbit/s and 400 Mbit/s. The backplane environment will support 25 Mbit/s and 50 Mbit/s. These rates are actually "bit" rates, independent of the encoding scheme. The actual clock rate in a redundant encoding scheme is referred to as a "baud" rate and is independent of the clock rate of this interface.

The physical layer 54 has control over the bi-directional pins for transferring the data and the control bits. The link layer 52 only drives these pins when control is transferred to it by the physical layer 54. The link performs all unsolicited activities through a dedicated request pin on line 64. The possible actions that may occur on the interface are categorized as transmit, receive, status and request. The SCLK is driven by the physical layer 54 and is generally synched to the serial bus clock at a rate of 49.152 MHz. There is provided a backplane input on the link layer 52 which, if set high, indicates that the physical layer is in a backplane environment. Another input, a Clk25 input, when set high, forces the SCLK output from the physical layer 54 on the line 66 to a value of 24.576 MHz.

When data is carried between the two chips, the width of the data bus 60 depends on the maximum speed of the connected physical layer 54, two bits for every 100 Mbit/s. Therefore, packet data for a 100 Mbit/s transmit utilizes D[0:1], 200 Mbit/s transfers utilize D[0:3], and 400 Mbit/s transfers utilize the full D[0:7]. The unused D[n] signals are driven low. The control bus 62 always carries two bits. Whenever control is transferred between the physical layer 54 and the link layer 52, the side surrendering control always drives the control and data pins to a logic "0" level for one clocks before tri-stating its output buffers.

As noted above, there are four basic operations that may occur in the interface: request, status, transmit and receive. To request the bus or access a register in the physical layer 54, the link layer 52 sends a short serial stream to the physical layer 54 on the request pin 64. When the physical layer 54 has status information to transfer to the link layer 52, it will initiate a status transfer. The physical layer 54 will wait until the interface is idle to perform this transfer, and it will initiate the transfer by asserting a status bit on the control bus 62. It will also provide at the same time the first two bits of status information on D[0:1]. When the link requests access to the serial bus through the request line 64, the physical layer 54 arbitrates for access to the serial bus 58. When it wins the arbitration, it will then grant the bus to the link layer 52 by asserting "transmit" on the control bus 62 for one cycle of the SCLK. It will then be idle for a single cycle. After sampling the "transmit" state from physical layer 54, the link layer 52 will then take over control of the interface by asserting either a "hold" or a "transmit" on the control bus 62. During a receive operation, whenever the physical layer 54 sees a "data-on" state on the serial bus 58, it initiates a receive operation by asserting "receive" on the control bus 62 and a logic "1" on each of the data pins. Physical layer 54 then indicates the start of a packet by placing the speed code on the data pins. For 100 Mbit/s, the data bits will be "00xxxxxx," and for 200 Mbit/s, it will be "0100xxxx," with 400 Mbit/s being "01010000," the value "x" being a non operation.

The link layer 52 will interface with a buffer in the form of a FIFO 70, which is controlled by a read/write FIFO control block 71 that defines the position of the read and write pointers and all accesses in and out of the FIFO. The other side of the FIFO 70 is interfaced with the host bus 72, which host bus 72 is a 32-bit bus.

Figure 4:
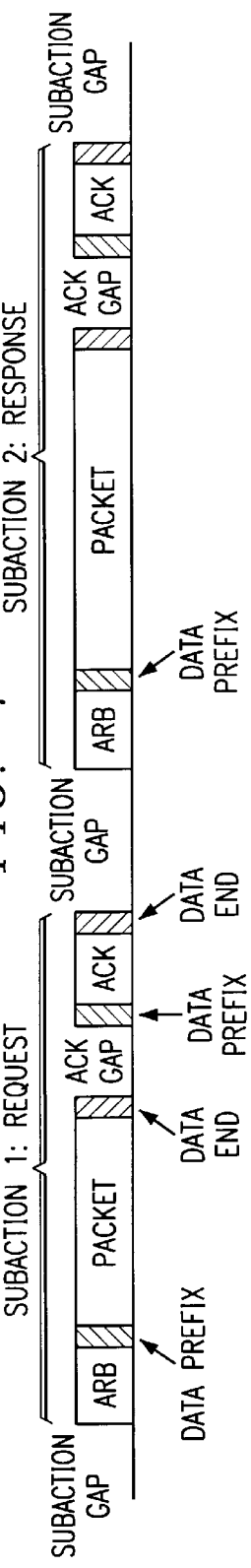
FIG. 4 illustrates an example of an asynchronous transmission over the serial bus.

Referring now to FIG. 4, there is illustrated a subaction in the link layer 52 for an asynchronous transmission of a packet. This subaction is in the form of a request and a response. There is provided an arbitration sequence which is transmitted by a node that wishes to transmit a packet, this being transmitted to the physical layer 54 to gain control of the bus 58. The physical layer 54 may then respond immediately if it already controls the bus. This is followed by a data packet transmission which, for asynchronous subactions, involves the source node sending a data prefix signal (including a speed code, if needed), addresses of the source node and destination nodes, a transaction code, a transaction label, a retry code, data, one or two cyclic redundancy checks (CRCs), and a packet termination (either another data prefix or a data end signal). This is all followed by an acknowledgment field wherein a uniquely addressed destination returns a code indicating to the transmitting node the action taken by the packet receiver. Each of these asynchronous subactions is separated by periods of idle bus called "subaction gaps." This gap is disposed between the packet transmission and acknowledgment reception. This "ack-gap" is of varying lengths depending upon where the receiver is on the bus with respect to the senders of the link request and acknowledgment (ack). However, the maximum length of the ack-gap is sufficiently shorter than a subaction gap to ensure that other nodes on the bus will not begin arbitration before the acknowledgment has been received.

Figure 5:
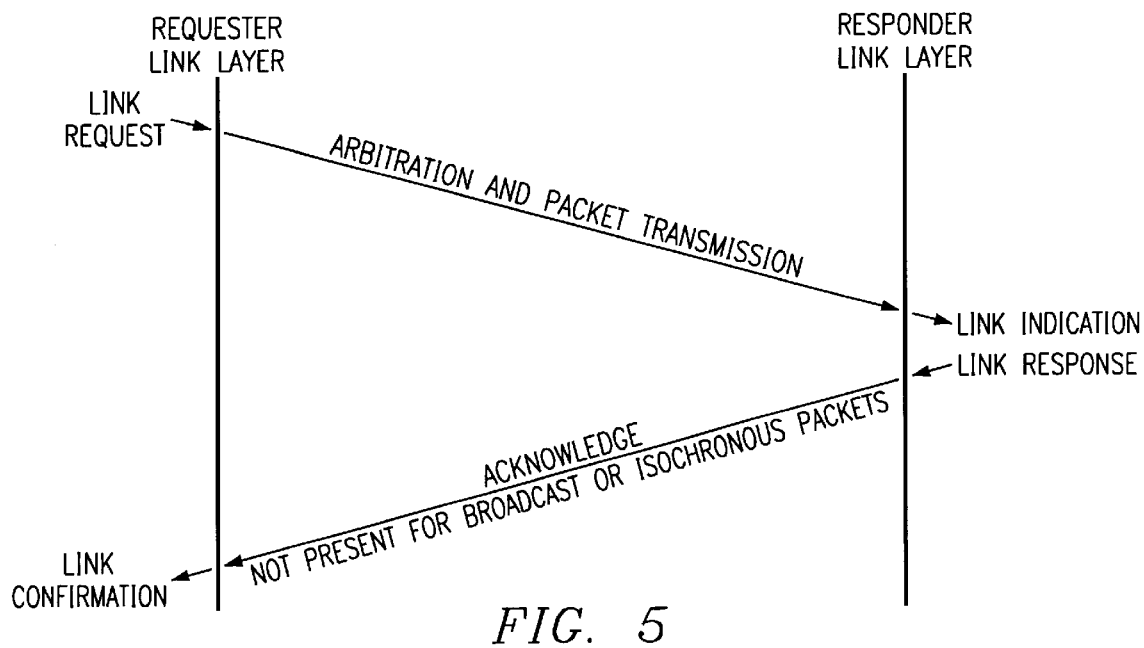
FIG. 5 illustrates a diagrammatic view of how the link layer services a transaction.

Referring now to FIG. 5, there is illustrated a diagrammatic view of the manner in which the link layer 52 services a request. As noted above, the link layer 52 utilizes the request, indication, response and confirmation service primitives. The request primitive is utilized by a link requester to transfer the packet to a link responder. An indication primitive indicates the reception of a packet by a link responder. A response primitive indicates the transmission of an acknowledgment by a link responder, and the confirmation primitive indicates the reception of the acknowledgment by the link requester. Once the link request has been made, the system goes through an arbitration and packet transmission to the receiving node, which then provides a response back in the form of an acknowledgment to the requesting link layer, which will then confirm transmission.

Figure 6:
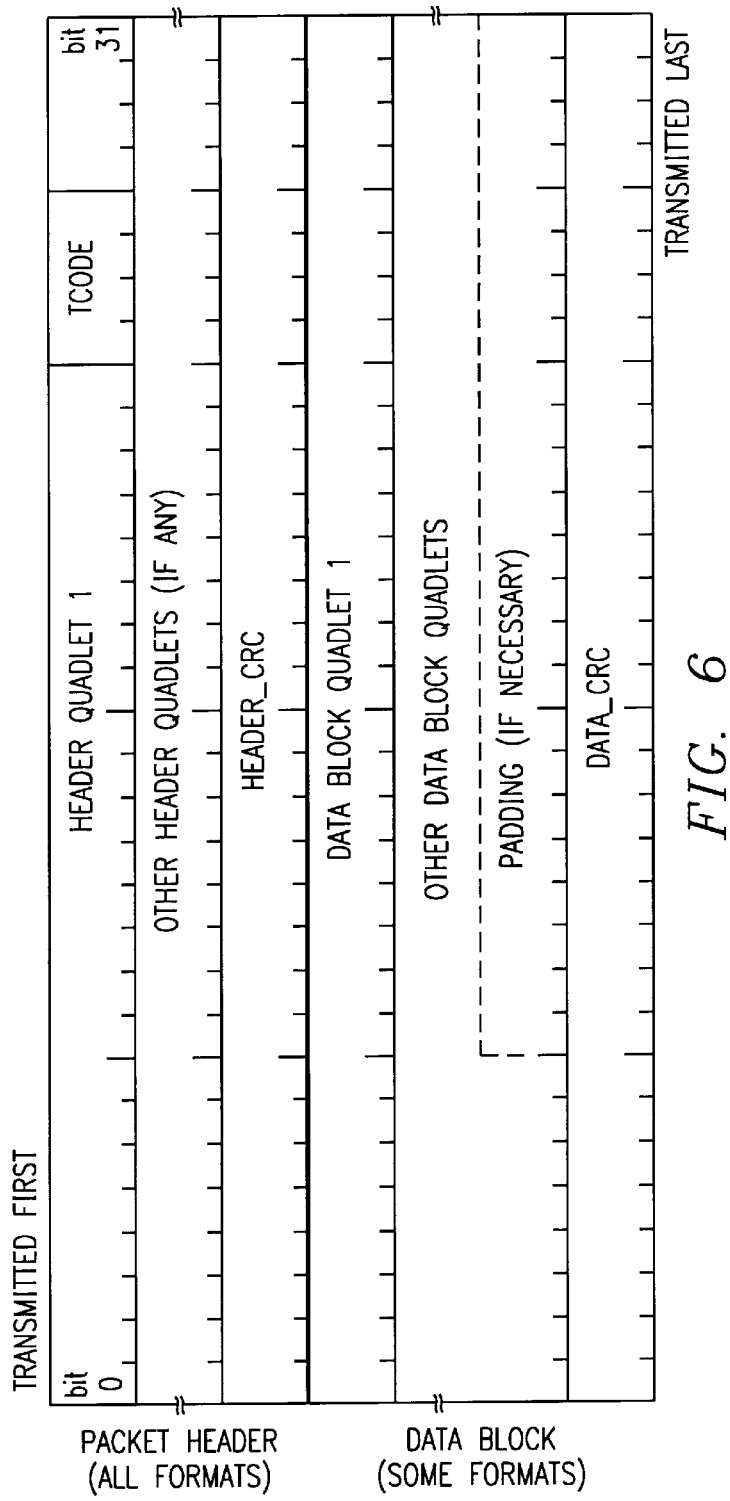
FIG. 6 illustrates a primary packet data format.

Referring now to FIG. 6, there is illustrated a register map for a packet that is transmitted. The packet is configured with a header that contains a plurality of quadlets. Typically, the first quadlet will contain the physical ID and the last quadlet will contain the header CRC. The header packet is followed by a data block which consists of a plurality of data quadlets with the last quadlet being a data CRC quadlet. The packet header in the first quadlet thereof contains a transaction code which defines the packet type of a primary packet. The transaction packet code specifies the packet format and the type of transaction that shall be performed. This could be such things as a write request for a data quadlet, a write request for a data block, read requests for data quadlets and data blocks, and read responses for data quadlets and data blocks. The asynchronous data packet noted above with respect to FIG. 4 is a primary data packet.

Figure 7:
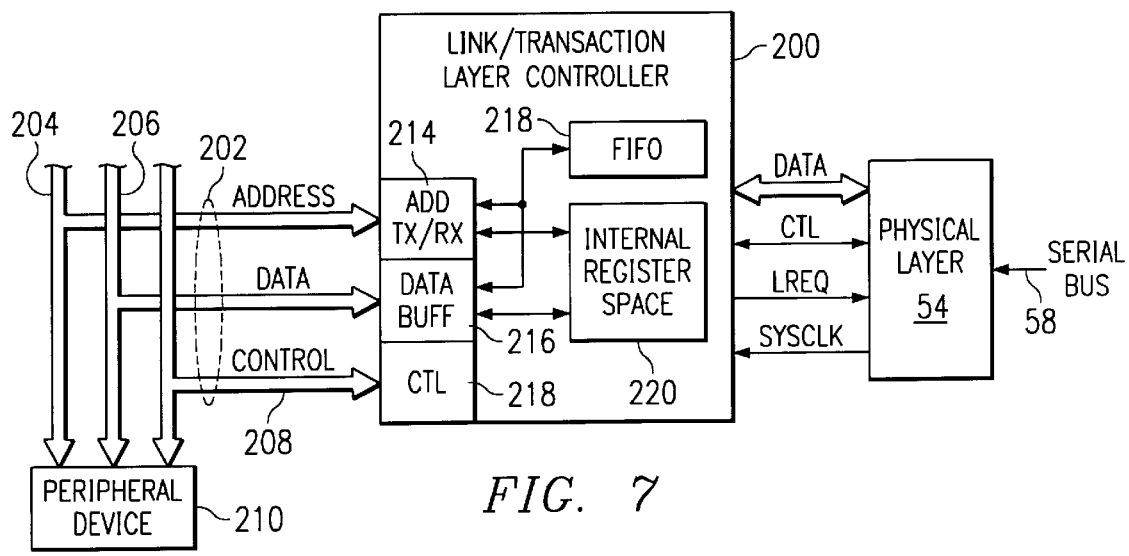
FIG. 7 illustrates a block diagram of the link/transaction layer controller with the microcontroller emulator interface.

Referring now to FIG. 7, there is illustrated a block diagram of the preferred embodiment of the present invention. As described hereinabove, the physical layer 54 is interfaced with both a link layer 52 and a transaction layer 50, this being illustrated in FIG. 2. In the preferred embodiment of the present invention, there is provided a link/transaction layer controller 200 which controller 200 is operable to interface between the physical layer and a set of host system buses 202 comprised of an address 204, a data bus 206 and a control bus 208. The host bus 202 is operable to interface with a peripheral device 210. The controller 200 is configured such that it provides all the functions of the link layer 52, the transaction layer 50, and the serial bus 56 of FIG. 2, in addition to essentially emulating the operation of a microcontroller. Therefore, as will be described hereinbelow, the controller 200 can directly interface between the serial bus 58 and the physical device 200 without the requirement of a separate microprocessor or microcontroller.

In addition to all of the functionality of the link layer 52 and the transaction layer 50, there is provided an interface for interfacing with the host bus 202. The controller 200 is operable with the use of an address block 214 to transmit addresses to the address bus 204 and to receive from the address bus 204 addresses. Data can be transmitted to and from the data bus 206 through a data buffer 216 and control information can be transmitted to and from the control bus 208 through a controller 218. Internal to the controller 200 is an internal register space 220, which will be described in more detail hereinbelow and which is operable to define the controller 200 in a conventional address space such as an IEEE 1212 CSR address space. The internal register space 220 is internal to the controller 200 and is accessible by systems at other nodes to allow Write and Read requests directly to these registers. An internal FIFO 219 is provided, which basically functions in conjunction with the data buffer 216 to buffer data transfers between the host side of the system and the serial bus side.

In operation, a CPU (not shown) at another location on the serial bus can access the internal registers 220 to determine what type of device resides at this particular node. Once it recognizes that this node has the specific architecture that allows direct access to the peripheral devices, then data transfer can be affected in accordance with the present invention. If information in an internal register within the controller is desired by the remote location, the data packet from the transmitting device will be arranged such that the data is comprised of both address information and data information which will be recognized by the controller 200. This will be recognized as not only an address but also a request for a Write or Read operation, which operation can then be performed. If the transmitting node desires to access peripheral device 210, it need only transmit sufficient information to the controller 200 in the form of address and data information to instruct the controller 200 to basically transfer the received address to the address bus 204 and then transmit the received data to the peripheral device 210 over the data bus 206. This is due to the fact that the peripheral unit occupies a specific portion of the address space of the controller 200 and, when such address is received, the controller will immediately transfer this address to the address bus 204 for the host side and simultaneously place the data on the host data bus, in addition to generating the appropriate Read or Write commands for the host system. This is to be compared with a conventional transaction which requires the data to be first stored in a FIFO and then an interrupt generated by the transaction layer 50 to an associated microcontroller. The microcontroller will then act upon this interrupt and retrieve the appropriate information from the FIFO and perform the subsequent processing. The system of the present invention, by comparison, directly interfaces with the system bus 202 to enable the controller 200 to autonomously receive and transmit both asynchronous and isochronous data.

Figure 7A:
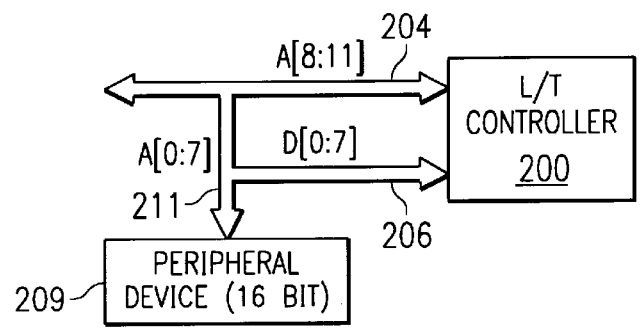
FIG. 7a illustrates an alternate embodiment of the data bus interface to the peripheral unit.

In an alternate embodiment of the present invention, illustrated in FIG. 7a, a portion of the address bus 204 and the data bus 206 from the controller 200 are combined. In the preferred embodiment, the data bus 206 is an 8-bit data bus and address bus 204 is a 12-bit bus. By utilizing eight bits of the address bus 204 and all eight bits of the data bus 206, a new data bus 211 can be realized which is a 16-bit data bus. This is input to a 16-bit peripheral unit 209 for allowing 16-bi data to be transferred therebetween. This is a unique mode that allows 16-bit data to be transferred in certain applications. This is merely due to the fact that a limited number of pins are provided on the chip. Additionally, it can be seen that the data is transferred to the 16-bit data bus 211 via the seven least significant bits of the address bus 207 and all of the data bits of the data bus 206 by the fact that the controller 200 recognizes that the remote node is sending information that is to be output on the address and data buses. It is important to note that the controller 200 is not actually performing the addressing operation and is making no decisions as to what is on the address bus 204 or the data bus 206; rather, it is merely transferring the data and address information to these two buses as a result of the remote node sending the information to the controller 200 in a particular manner. It is only important that the remote node recognize how to get the information to the address bus 204 and data bus 206. As will be described in more detail hereinbelow, this merely requires the remote node to transmit the information to the specific internal register which will result in the controller 200 automatically outputting this information onto the appropriate buses. Since the remote node has knowledge of the type of device that it is transmitting information to, it will be aware of the fact that the information transmitted to the controller 200 is automatically transferred directly to the address bus 204 and the data bus 206.

Referring further to FIG. 7, the data transferred between the host or system bus 202 and the serial bus 58 is performed in one of two ways. In the first way, data is transferred to an internal register and immediately transferred to the address transmit/receive block 214 and data buffer 216 and immediately placed on data bus 206 and address bus 204. In this manner, a remote node can transfer information directly to the system bus 202. In another mode, the data is transferred to the internal FIFO 219 for storage therein and later transfer to the peripheral device 210. In a transmit operation, the data is received from the host or system bus 202 and stored in the FIFO 219 in a store-and-forward manner. This will later be transmitted on the serial bus.

Figure 8:
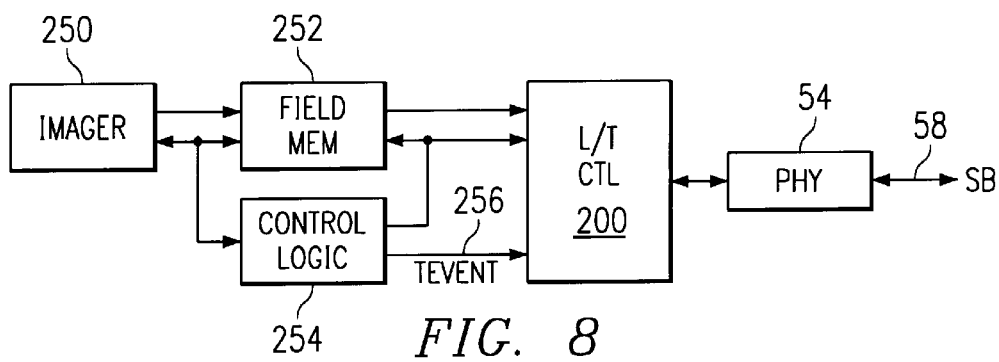
FIG. 8 illustrates an application of the link/transaction layer controller for a digital camera.

Referring now to FIG. 8, there is illustrated an application of the controller 200 in a digital camera. The digital camera includes an imager 250 and a field memory 252 which interfaces to the imager 250 for receiving data therefrom. The camera has associated therewith a control logic block 254 which is operable, upon data being transmitted thereto, to generate a transmission event signal TEVENT on a line 256 to the controller 200. The controller 200, upon receiving this signal, will then access data in the field memory 252 to transmit this information directly to the serial bus 58 and to a remote location. As noted hereinabove, internal registers 220 are provided which can be programmed to determine how this operation will be carried out and to which node it may be transmitted.

Figure 9:
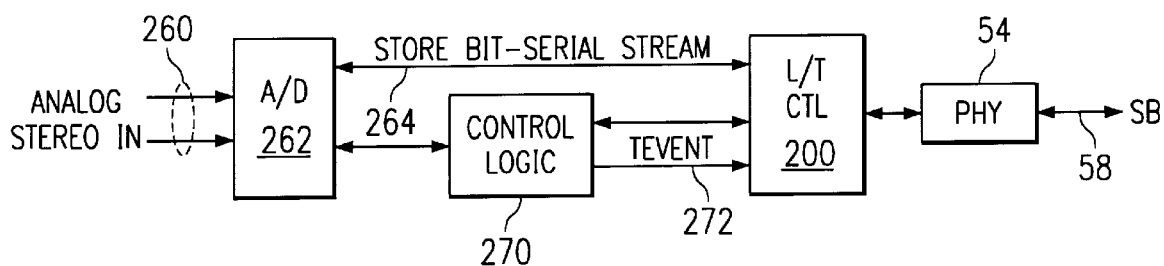
FIG. 9 illustrates a block diagram of an application of the controller for use with a stereo audio transmitter.

Referring now to FIG. 9, there is illustrated another application of the present invention, that for an audio transmitter. The analog input signal is a stereo input signal on lines 260 which is input to an analog/digital converter 262. The A/D converter 262 is of the type TLC320AD57C, manufactured by Texas Instruments. This will generate a stereo bit-serial stream on a line 264 to the data input of the controller 200. Control logic in a block 270 is utilized to generate on a line 272 a transmission event signal to indicate that information is being transmitted to the controller 200. The controller 200 with then interface with the control logic block 270 to control the generation of the data and transmission to the controller 200 for storage in the FIFO 219, which controller 200 will then transmit this data to the serial bus 58.

Figure 10:
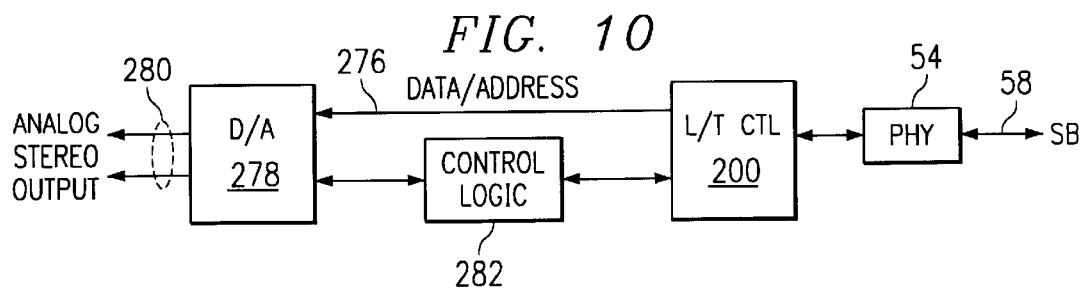
FIG. 10 illustrates a block diagram of an application of the controller for a stereo audio receiver.

Referring now to FIG. 10, there is illustrated another application of the controller 200, wherein the controller 200 is utilized as an audio receiver. The controller 200 will receive data from the serial bus 58 in a continuous manner. This data will continually be decoded, stored in the FIFO 219 and transmitted on data/address lines 276 to a digital/analog converter 278 for output as an analog stereo output signal on lines 279. A control logic block 282 is provided for interfacing with the controller 200. The data/address information is transmitted with 8 bits of data and 8 bits of address information.

Figure 11:
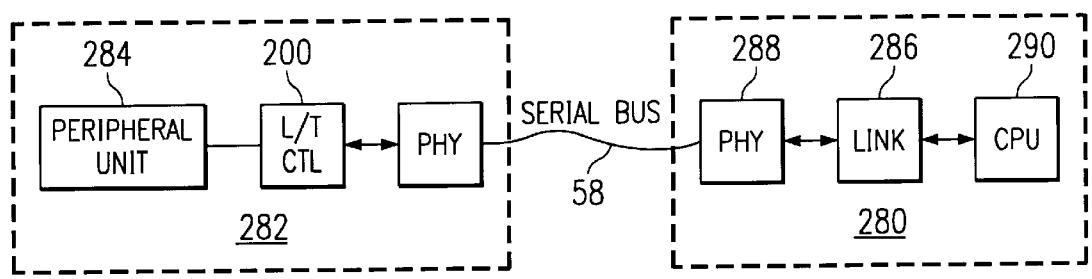
FIG. 11 illustrates a block diagram of a peripheral unit associated with the link/transaction layer controller on one side of the serial bus and a CPU interfaced with the serial bus on the other side at a remote location for controlling the peripheral unit through the link/transaction controller.

Referring now to FIG. 11, there is illustrated a block diagram of a general application wherein a remote transmitting node 280 is operable to transmit information to a local node 282. The local node 282 is configured with the controller 200 described hereinabove and a peripheral unit 284, to which information is to be transmitted from the remote node 280. The remote node 280 has associated therewith a link layer 286 and a transaction layer (not shown) in addition to a physical layer 288. Therefore, the physical layer 288 and the link layer 286 allow the remote node 280 to communicate over the serial bus 58 with the local node 282 and send data packets thereto and receive data packets therefrom. A CPU 290 is provided at the remote node 280 for communicating with the peripheral unit 284 at the local node 282. As described hereinabove, the CPU 290 is operable to communicate with a plurality of nodes on the bus 58. To communicate with the node 282, it first must know what type of node exists at the local node 282. To do this, it will access a known register location in the address space of the controller 200, this being a typical CSR 1212 address space. The local node 282 is configured with this address space; however, all other nodes are also configured with the CSR 1212 address space. When accessing the specific address location in the controller 200, the CPU 290 need not go to another CPU on the local node but, rather, goes directly to an internal register to the controller 200 when such request is made. The controller 200 will then transmit to the serial bus 58 the requested information. Once the CPU 290 recognizes that the controller 200 exists at the local node 282, it will then generate its Read and Write requests in a slightly different manner than normal. It will transmit them knowing that it can virtually make a direct access to the address space of the peripheral unit 284 without having to go through a FIFO, this being described hereinbelow. This in effect transfers some of the functionality of a CPU that would normally reside at the local node to the remote node. Further, the CPU 290 at the remote node can also transmit configuration instructions directly to the internal registers of the controller 200 to configure these registers.

To allow a CPU 290 at the remote node to program the controller 200 at the local node, a plurality of configuration registers are mapped into the address space of the controller 200. These configuration registers are immediately accessible from the host interface. In general, the IEEE 1394 bus protocol uses a 64-bit fixed addressing scheme. This 64-bit address consists of a 10-bit bus number, 6-bit node number, 20-bit page address and 28-bit offset. There are 3 addressable memory spaces for each node. They are memory, private and register space. The addresses for each space are set forth in Table 1:

TABLE 1

| | |
|---|---|
| Memory | Bus_Node_00000_0000000 |
| | Bus_Node_FFFFD_FFFFFFF |
| Private | Bus_Node_FFFFE_0000000 |
| | Bus_Node_FFFFE_FFFFFFF |
| Register | Bus_Node_FFFFF_0000000 |
| | Bus_Node_FFFFF_FFFFFFF |

Figure 12:
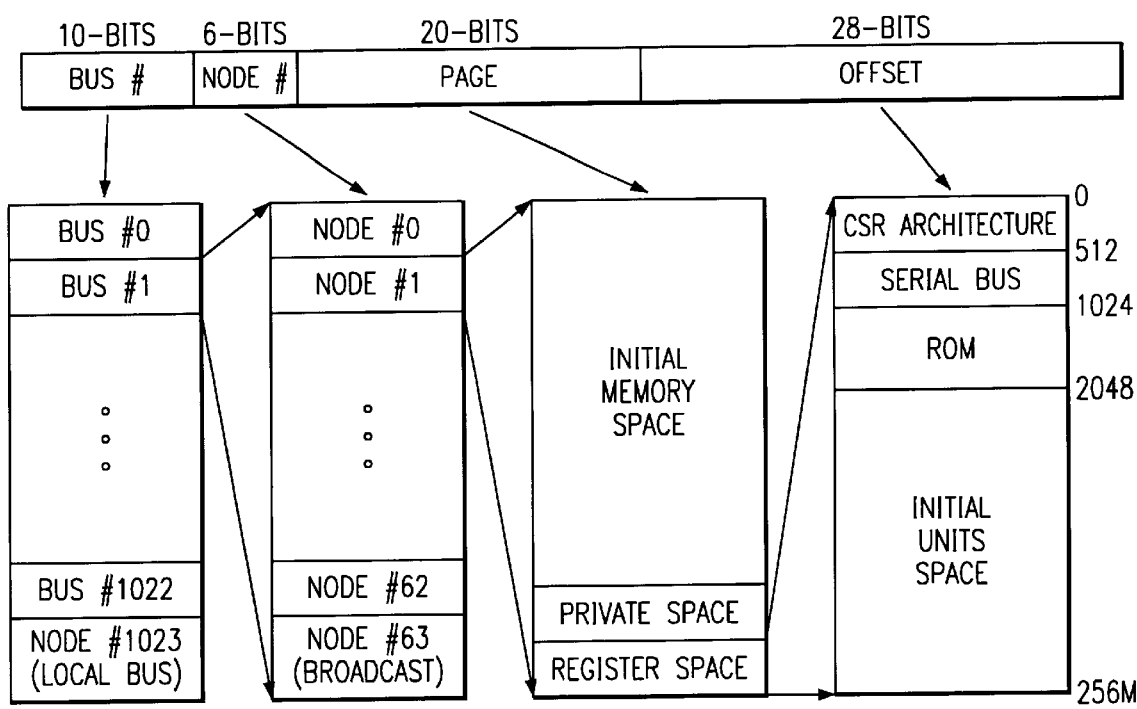
FIG. 12 illustrates a diagrammatic view of the 64-bit addressing map for the IEEE 1394 bus.

The address construction for the 64-bit addressing scheme is constructed in accordance with the diagram of FIG. 12. In FIG. 12, it can be seen that it is necessary to send sufficient information to the physical layer for the physical layer to extract the information from the serial bus 58. Once stripped, it need not transmit all of this information to the link/transaction controller 200. It need only transmit the page address and the 28-bit offset information, this 28-bit offset information defining the internal register space.

Figure 13:
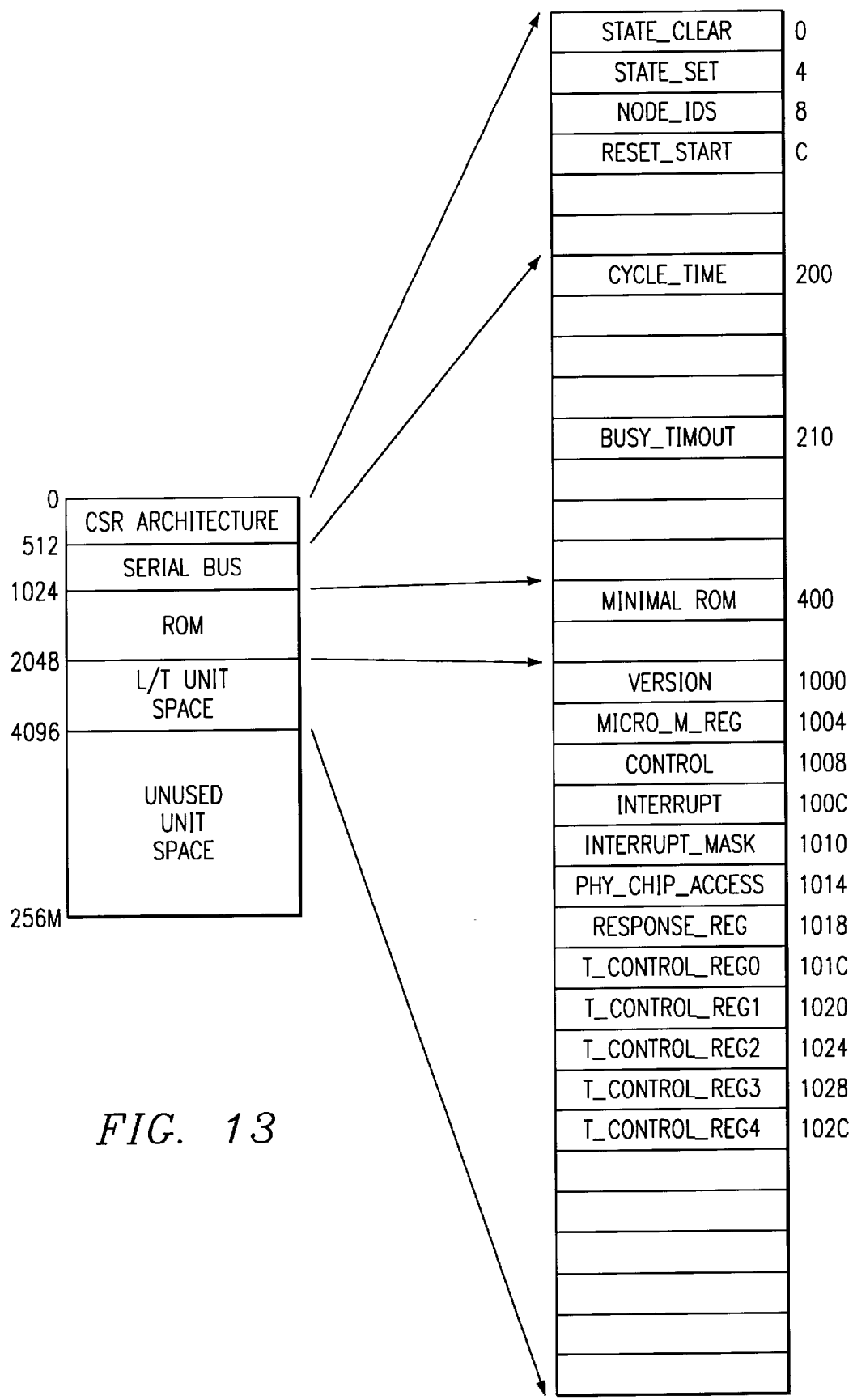
FIG. 13 illustrates a register map for the link/transaction layer controller.

Referring now to FIG. 13, there is illustrated a diagrammatic view of the address space for the internal register space for a given controller 200. To make the controller 200 compliant with the IEEE 1212 CSR address space, it is necessary to ensure that certain information is at particular locations within the address space. Therefore, the CSR address space will have from locations 0–512 information as to the CSR architecture, from locations 512–1024, information regarding the serial bus, and from locations 1024–2048, Read Only Memory locations, these not necessarily being changed, from locations 2048–4096, information regarding the particular controller unit itself, and the remaining locations 4096–256M reserved as unused unit space.

Not all of the memory locations within a given region are required to provide a functioning part. Therefore, only the minimal information necessary is stored. For example, with respect to the CSR address space architecture, only 4 registers are provided, that for the STATE_CLEAR, STATE_SET, NODE_IDS and RESET_START. With respect to the serial bus region, there is only provided information regarding CYCLE_TIME and BUSY_TIMOUT in two registers. With respect to information that would be considered to be Read Only Memory information, this is stored in a location entitled MINIMAL_ROM. This generally is the information regarding the manufacturer, the part and the type associated with the part. In the locations associated with the unit space, there are stored such things as versions, types of interrupts, types of interrupt masks and various chip access information for the physical layer. Additionally, there are also provided a plurality of transmit control registers labeled T_CONTROL_REG0–4. These registers will be described in more detail hereinbelow.

Whenever the controller 200 receives a request from the serial bus 58, it decodes the entire 64-bit address. If the decoded address constitutes an address in the CSR register space, and the lower 12-bits point to an on-chip register, i.e., the registers noted in FIG. 13 as having information stored therein, then that register is accessed from the serial bus 58. It should be noted that there are a large number of locations which are reserved for the CSR 1212 register space which are not occupied. The reason for this is that only a minimal set of registers are provided. If, for some reason, the instructions or information normally found in the unpopulated portion of the address space, i.e., that not included in the controller 200, were required to operate from the remote node, then external registers at the local node occupying that address space would be required. Whenever a Write operation is directed toward an on-chip register at the local node controller 200, these Writes are echoed to the host interface if an internal echo bit, CSR_WR_ECHO, is set. The host interface address (A[11:0]) is simply the 12 LSBs of the 64-bit serial bus address. A special case of accessing the on-chip registers is that of accessing the Micro_M_Reg, which will be described hereinbelow. If the register space that is decoded in the lower 12-bits point to a register not on-chip, then the controller 200 will recognize this and both Writes and Reads will performed on the host interface, assuming that the CSR 1212 is implemented by the application. It should be understood that the CSR 1212 register space is only one standard and that any other register space could be utilized, as long as the remote node is aware of the particular standard being utilized by the controller 200 at any node. The CSR 1212 is utilized in the present application to make the parts compliant with a well known standard.

In general, the type of host accommodated by the chip is defined by external hardware pins labeled HTYP, which define the host type. If the host type is set to an 8-bit master, the system can emulate a microcontroller and interface the host system.

If the host type is set to only CSR access mode, only the internal CSRs between locations 0–4096 are accessible.

There are four fundamental modes of operation for the controller 200. They are:

1. Asynchronous receive;
2. Asynchronous transmit;
3. Isochronous transmit; and
4. Host CSR access.

A summary of the transaction types supported and the mapping to the host interface transactions is set forth in Table 2.

TABLE 2

Transaction Summary

| HTYPE | Received 1394 Transaction | Host Interface Transaction | ack | Transmitted 1394 Transaction | AADEC |
|---|---|---|---|---|---|
| 0 | Quadlet write request to Micro_M_Reg dest_addr = Node_id, FFFFF,Micro_M_Reg | 8-bit master byte write A[11:0] = quadlet_data[12:23] D[7:0] = quadlet_data[24:31] | 1<br>2<br>1 | If Write_Resp_En is not set, no write response.<br>If Write_Resp_En is set, Write response on CAZ<br>Write response is concatenated if Write_Resp_Cat is set. | 0 |
| 1,2 | Quadlet write request to Micro_M_Reg dest_addr = Node_id, FFFFF,Micro_M_Reg | None | 4 | None | 0 |
| 0 | Quadlet read request to Micro_M_Reg dest_addr = Node_id, FFFFF,Micro_M_Reg | 8-bit master byte read A[11:0] = quadlet_data[12:23] response quadlet_data[24:31] = D[7:0] | 2<br>1 | Read response on CAZ.<br>Read response is concatenated if Read_Resp_Cat is set. | 0 |
| 1,2 | Quadlet read request to Micro_M_Reg dest_addr = Node_id, FFFFF,Micro_M_Reg | None | 4 | None | 0 |
| 0 | Quadlet write request to Initial Memory Space | Four 8-bit master byte writes (order is 0,1,2,3) A[11:0] = dest_addr[20:31] + n | 1 | If Write_Resp_En is not set, no write response. | 1 |

TABLE 2-continued

Transaction Summary

| HTYPE | Received 1394 Transaction | Host Interface Transaction | ack | Transmitted 1394 Transaction | AADEC |
|---|---|---|---|---|---|
|  | Node_id, 00000, 0000000 <= dest_addr < Node_id, FFFFE, 0000000 | D[7:0] = byte n of quadlet_data[0:31] | 2<br>1 | If Write_Resp_En is set, Write response on last CAZ<br>Write response is concatenated if Write_Resp_Cat is set. |  |
| 1 | Quadlet write request to Initial Memory Space Node_id, 00000, 0000000 <= dest_addr < Node_id, FFFFE, 0000000 | 16-bit slave mode<br>First Access<br>A[7:0] = quadlet_data[0:7]<br>D[7:0] = quadlet_data[8:15]<br>Second Access<br>A[7:0] = quadlet_data[16:23]<br>D[7:0] = quadlet_data[24:31] | 1<br>2<br>1 | If Write_Resp_En is not set, no write response.<br>If Write_Resp_En is set, Write response on last CAZ<br>Write response is concatenated if Write_Resp_Cat is set. | 1 |
| 1 | Block write request to Initial Memory Space Node_id, 00000, 0000000 <= dest_addr < Node_id, FFFFE, 0000000 | 16-bit slave mode, data read from host interface until CAZ indicates last data<br>First Access<br>A[7:0] = quadlet_data[0:7]<br>D[7:0] = quadlet_data[8:15]<br>Second Access<br>A[7:0] = quadlet_data[16:23]<br>D[7:0] = quadlet_data[24:31]<br>Subsequent Accesses<br>A[7:0] = next quadlet_data[0:7]<br>D[7:0] = next quadlet_data[8:15] | 1<br>2<br>1 | If Write_Resp_En is not set, no write response.<br>If Write_Resp_En is set, Write response on last CAZ<br>Write response is concatenated if Write_Resp_Cat is set. | 1 |
| 2 | Quadlet or block write request to Initial Memory Space Node_id, 00000, 0000000 <= dest_addr < Node_id, FFFFE, 0000000 | None | 4 | None | 1 |
| 0 | Quadlet read request to Initial Memory Space Node_id, 00000, 0000000 <= dest_addr < Node_id, FFFFE, 0000000 | Four 8-bit master byte reads (order is 0,1,2,3)<br>A[11:0] = dest_addr[20:31] + n<br>D[7:0] = byte n of quadlet_data[0:31] | 2<br>1 | Read response on last CAZ.<br>Read response is concatenated if Read_Resp_Cat is set. | 1 |
| 1 | Quadlet read request to Initial Memory Space Node_id, 00000, 0000000 <= dest_addr < Node_id, FFFFE, 0000000 | 16-bit slave mode<br>First Access<br>A[7:0] = quadlet_data[0:7]<br>D[7:0] = quadlet_data[8:15]<br>Second Access<br>A[7:0] = quadlet_data[16:23]<br>D[7:0] = quadlet_data[24:31] | 2<br>1 | Read response on last CAZ.<br>Read response is concatenated if Read_Resp_Cat is set. | 1 |
| 1 | Block read request to Initial Memory Space Node_id, 00000, 0000000 <= dest_addr < Node_id, FFFFE, 0000000 | 16-bit slave mode, data read from host interface until CAZ indicates last data.<br>First Access<br>A[7:0] = quadlet_data[0:7]<br>D[7:0] = quadlet_data[8:15]<br>Second Access<br>A[7:0] = quadlet_data[16:23]<br>D[7:0] = quadlet_data[24:31]<br>Subsequent Accesses<br>A[7:0] = next quadlet_data[0:7]<br>D[7:0] = next quadlet_data[8:15] | 1<br>2<br>1 | If Write_Resp_En is not set, no write response.<br>If Write_Resp_En is set, Write response on last CAZ<br>Write response is concatenated if Write_Resp_Cat is set. | 1 |
| 2 | Quadlet or block read request to Initial Memory Space Node_id, 00000, 0000000 <= dest_addr < Node_id, FFFFE, 0000000 | None | 4 | None | 1 |
| 0 | Quadlet write request to External CSR (Node_id, FFFFF,0000000 <= dest_addr <= Node_id, FFFFF,FFFFFFF) and dest_addr not in set of internal registers. | Four 8-bit master byte writes (order is 0,1,2,3)<br>A[11:0] = dest_addr[20:31] + n<br>D[7:0] = byte n of quadlet_data[0:31] | 1<br>2<br>1 | If Write_Resp_En is not set, no write response.<br>If Write_Resp_En is set, Write response on last CAZ.<br>Write response is concatenated if Write_Resp_Cat is set. | 2 |
| 1,2 | Quadlet write request to External CSR (Node_id, FFFFF,0000000 <= dest_addr <= Node_id, FFFFF,FFFFFFF) and dest_addr not in set of internal registers. | None | 4 | None | 2 |
| 0 | Quadlet read request to External CSR (Node_id, FFFFF,0000000 <= dest_addr <= Node_id, FFFFF,FFFFFFF) and dest_addr not in set of internal registers | Four 8-bit master byte reads (order is 0,1,2,3)<br>A[11:0] = dest_addr[20:31] + n<br>D[7:0] = byte n of quadlet_data[0:31] | 2<br>1 | Read response on last CAZ.<br>Read response is concatenated if Read_Resp_Cat is set. | 2 |

TABLE 2-continued

Transaction Summary

| HTYPE | Received 1394 Transaction | Host Interface Transaction | ack | Transmitted 1394 Transaction | AADEC |
|---|---|---|---|---|---|
| 1,2 | Quadlet read request to External CSR (Node_id, FFFFF,0000000 <= dest_addr <= Node_id, FFFFF,FFFFFFF) and dest_addr not in set of internal registers. | None | 4 | None | 2 |
| 0 | Quadlet write request to Internal CSR (Node_id, FFFFF,0000000 <= dest_addr <= Node_id, FFFFF,FFFFFFF) and dest_addr in set of internal registers | If CSR_WR_ECHO bit is set, four 8-bit master byte writes (order is 0,1,2,3) A[11:0] = dest_addr[20:31] + n D[7:0] = byte n of quadlet_data[0:31] If CSR_WR_ECHO bit is not set, no host transaction. | 1<br>2<br>1 | If Write_Resp_En is not set, no write response.<br>If Write_Resp_En is set, Write response on last CAZ.<br>Write response is concatenated if Write_Resp_Cat is set. | 3 |
| 1,2 | Quadlet write request to Internal CSR (Node_id, FFFFF,0000000 <= dest_addr <= Node_id, FFFFF,FFFFFFF) and dest_addr in set of internal registers. | None | 4 | None | 3 |
| 0 | Quadlet read request to Internal CSR (Node_id, FFFFF,0000000 <= dest_addr <= Node_id, FFFFF,FFFFFFF) and dest_addr in set of internal registers. | None | 2<br>1 | Read response on last CAZ.<br>Read response is concatenated if Read_Resp_Cat is set. | 3 |
| 1,2 | Quadlet read request to Internal CSR (Node_id, FFFFF,0000000 <= dest_addr <= Node_id, FFFFF,FFFFFFF) and dest_addr in set of internal registers. | None | 4 | None | 3 |

Each of the four modes of operation is described in detail in the sections below.

Asynchronous Receive

In Microcontroller Emulation Mode, AADEC [1:0]=0, controller 200 sources 8-bit Write and Read transactions on its host interface in response to Serial Bus Write or Read request transactions to CSR Micro_M_Reg. A Write request to Micro_M_Reg causes controller 200 to perform a Write transaction on its host interface with Address Am and Data Dm. The Least Significant Byte of the data written to Micro_M_Reg is asserted on D[7:0] and the next to least significant byte is asserted on A[11:0]. CSZ, CAZ, WEZ, AADEC, and HTYPE are part of the transaction with timing described in FIG. 17. A Read request to Micro_M Reg causes controller 200 to do a Read transaction on its host interface. When the Read is acknowledged with CAZ, controller 200 will transmit a Read response. If CAZ occures within 0.9 microseconds of CSZ, the read response will be concatenated to the corresponding request acknowledge. Only one outstanding Read request is allowed. Timing for this operation is illustrated in FIG. 18.

In Memory Mode, AADEC[1:0]=1, controller 200 services Serial Bus quadlet or block Read or Write requests addressed to the node's Initial Memory Space using an 8-quadlet internal FIFO. Host interface to FIFO transfers are either 8-bit master or 16-bit slave.

During an 8-bit Master Write Request, a Write request (quadlet or block) to Initial Memory Space stores data in FIFO. Controller 200 does byte sized Write transactions using A, D, WEZ, CSZ, and CAZ with SRAM like timing shown in FIG. 19. The address asserted on A[11:0] is the 12 LSBs of the destination address of the Write request.

Figure 20:
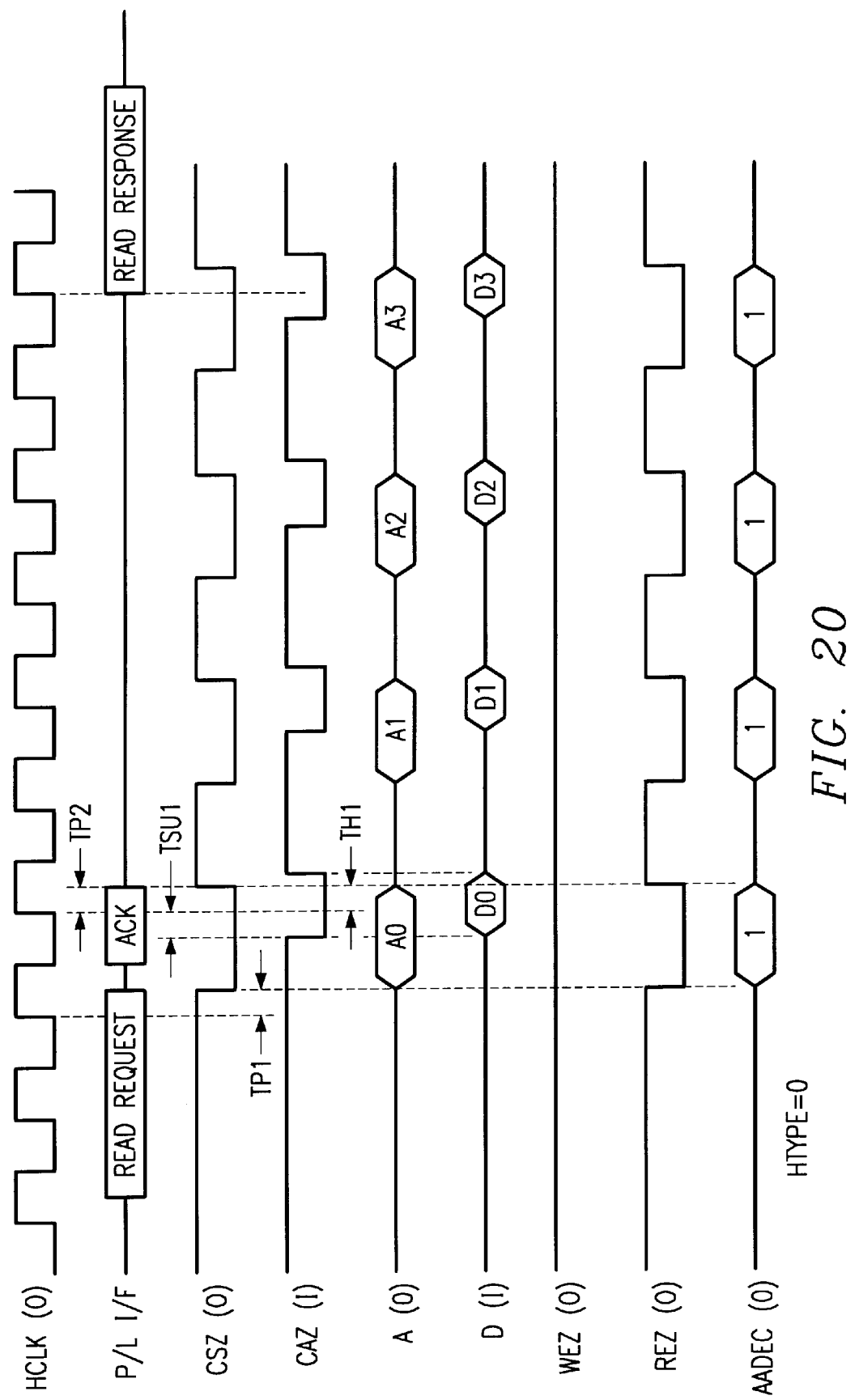
FIG. 20 illustrates a timing diagram for the receipt of a quadlet read request wherein the asynchronous address decode is to the memory.

During an 8-bit Master Read Request, controller 200 receives a Read request to Initial Memory Space and does byte sized transactions using A, D, WEZ, CSZ, and CAZ to Read data into the FIFO. When Read to FIFO is complete, controller 200 transmits a Read response. The timing for this operation is shown in FIG. 20. The address asserted on A[11:0] is the 12 LSBs of the destination address of the Read request.

Figure 21:
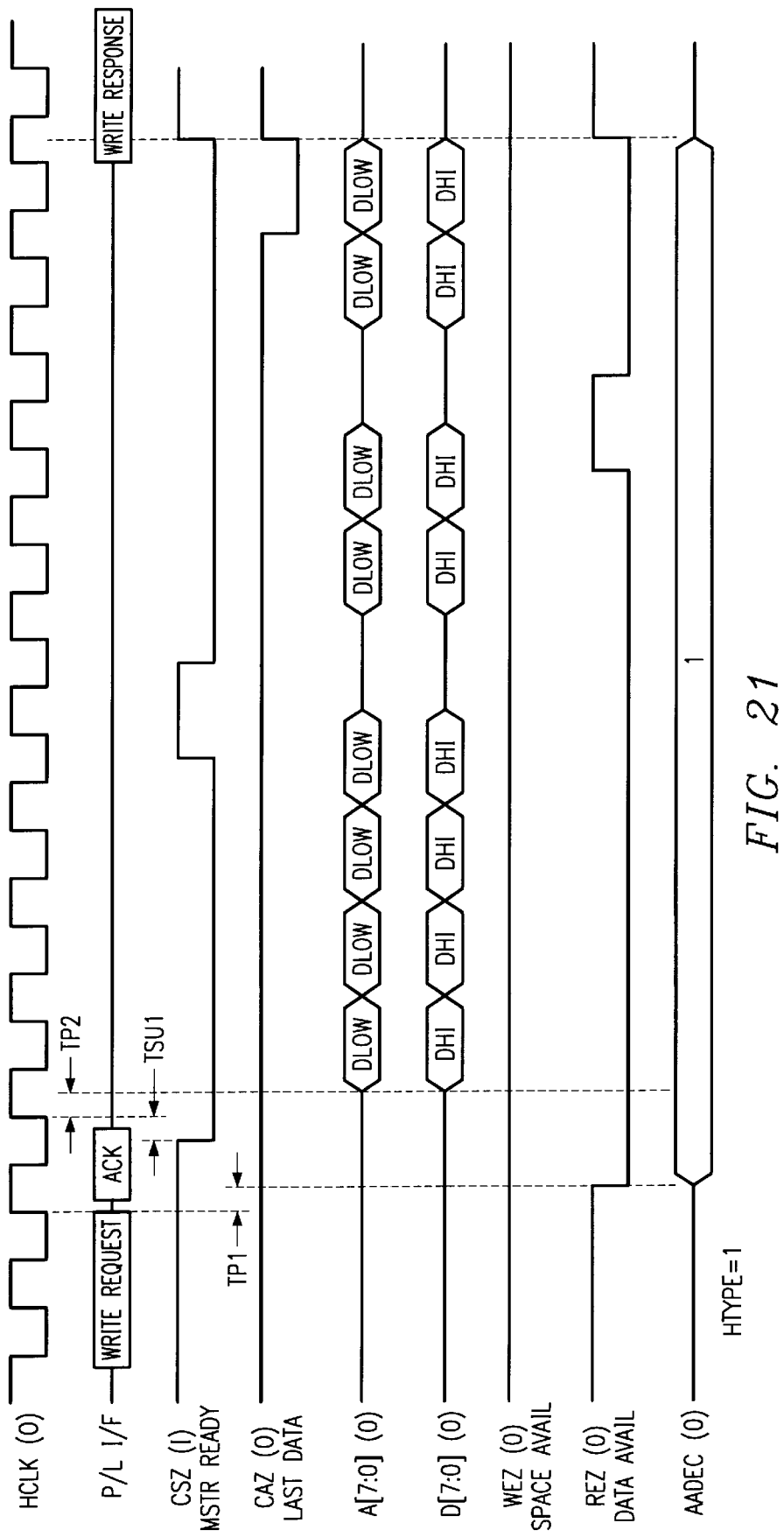
FIG. 21 illustrates a timing diagram for the receipt of a block write request.

During a 16-bit Slave Write Request, a Write request (quadlet or block) to Initial Memory Space stores data in the FIFO 219. Data is then read from the FIFO 219 by an external agent using {A[7:0],D[7:0]} as a 16-bit data bus. REZ indicates that a Write request was received and that data is available in the FIFO. CSZ is used to indicate that the external master is ready to receive data. Each time data is clocked out of controller 200, an internal doublet FIFO pointer is incremented. When the internal doublet pointer equals requested data length, CAZ is used to indicate the last data and a Write response is transmitted. The timing for this operation is shown in FIG. 21.

Figure 22:
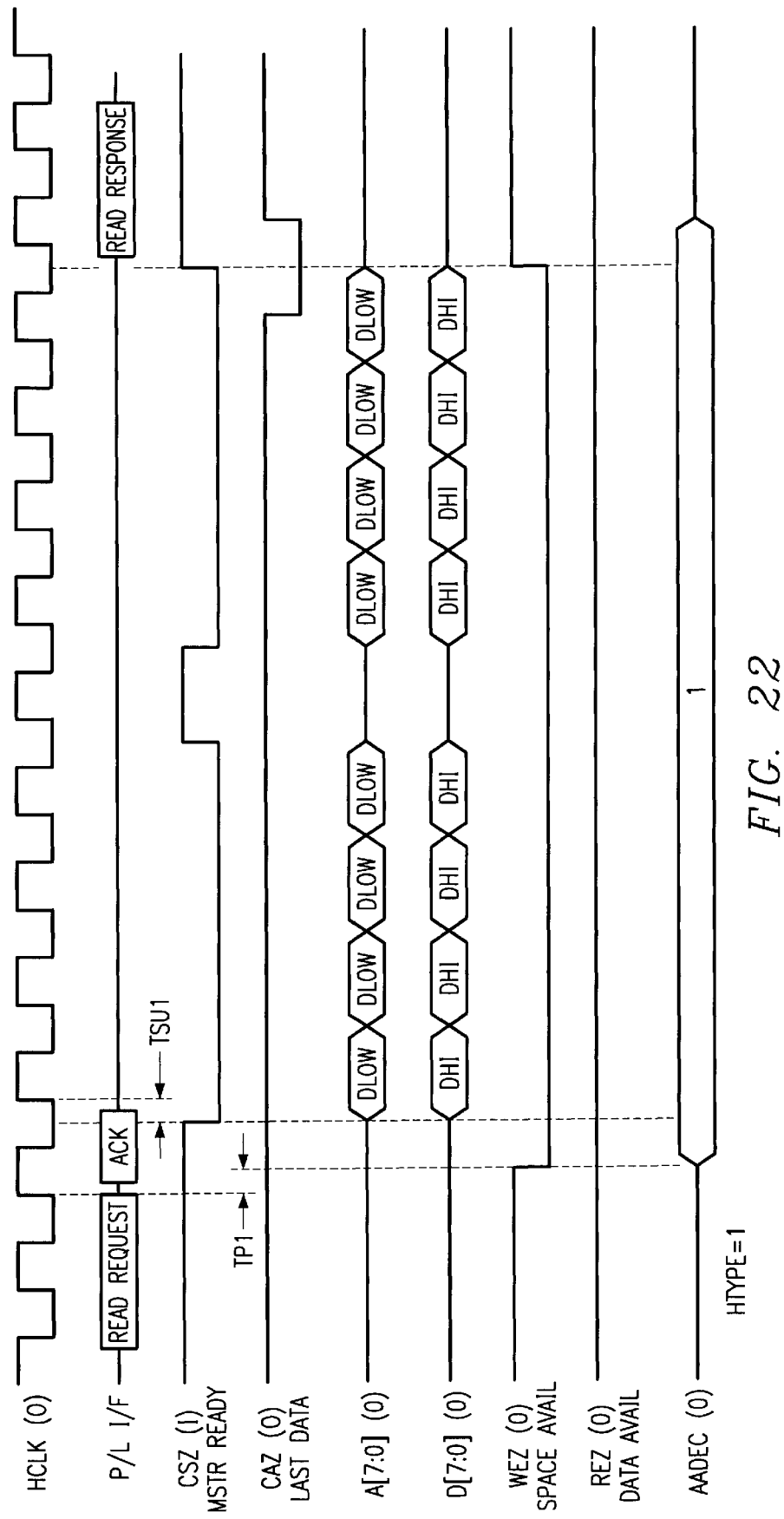
FIG. 22 illustrates a timing diagram for the receipt of a block read request.

In a 16-bit Slave Read Request, when controller 200 receives a Read request to Initial Memory Space, response data must be written into the FIFO 219 using {A[7:0],D[7:0]} as a 16-bit data bus. WEZ indicates that a Read request was received and that space is available in the FIFO. CSZ is used to indicate that the external master is sourcing data. Each time data is clocked into controller 200, an internal doublet FIFO pointer is incremented. When the internal doublet pointer equals requested data length, CAZ is used to indicate the last data and a Read response is transmitted. The timing for this operation is shown in FIG. 22.

In the External CSR mode, with AADEC[1:0]=2, Write requests and Read requests to registers in Initial Register Space and Initial Unit Space not contained in controller 200 are serviced using a byte sized SRAM like transaction the same as that for the 8-bit Master Memory Mode. In the Internal CSR mode, with AADEC[1:0]=3, Write requests and Read requests to registers in Initial Register Space and Initial Unit Space that are contained in controller 200 are performed internally without activity on the host interface unless the CSR_WR_ECHO bit is set. In this case, a quadlet Write request results in the quadlet being echoed on the host interface using a byte sized SRAM like transaction the same as the 8-bit Master Memory Mode.

Asynchronous Transmit

Controller 200 can be programmed to transmit asynchronous Write requests automatically at regular intervals or manually. Only Write requests for data quadlet and data block formats are supported. In the automatic (or Sensor) mode, the host interface in 8-bit master mode reads 1 to 8 quadlets of packet data into the FIFO 219. This mode is store-and-forward and the amount of data read is determined by the data_length field in T_Control_Reg3. This Read starts at the Sensor_Prefetch_Event. Controller 200 then prepends an asynchronous header to the packet using information in T_Control_Reg(0:3) and then transmits the assembled asynchronous Write request at the Sensor_Transmit_Event. The Sensor_Prefetch_Event can be programmed to occur on either internal or external events using the Sensor_Prefetch_Event_Select field of T_Control_Reg0:

Sensor_Prefetch_Event_Select options:
1. Sensor prefetch disabled
2. Internal Cycle Start
3. Internal Cycle Done; and
4. External Rising Edge of TEVENT pin.

The Sensor_Transmit_Event can also be programmed to occur on similar events using the Sensor_Transmit_Event_Select field of T_Control_Reg0:

Sensor Transmit Event Select options:
1. Sensor transmit disabled
2. Internal Cycle Start
3. Internal Cycle Done
4. External Falling Edge of TEVENT pin In the manual asynchronous transmit mode, the host interface in 16-bit slave mode is used to load quadlet or block data into the FIFO 219. This mode is flow-through and transmit pipelining can occur. When the amount of data loaded into the FIFO reaches the Tx_Threshold or the Manual_Transmit_Event occurs, controller 200 will prepend an asynchronous header to the packet using information in AT_Control_Reg(0:3) and begin transmitting a Write request. The external host interface master must keep pace with the transmit rate or FIFO under run will occur.

Flow control is provide to manage FIFO overrun. This is illustrated in the timing diagram in FIG. 21.

The Manual_Transmit_Event can be programmed to occur using the Manual_Transmit_Event_Select field of T_Control_Reg0:

Manual_Transmit_Event_Select options:
1. Internal Cycle Start
2. Internal Cycle Done
3. Manual_Transmit_Event bit set to one
4. External Falling Edge of TEVENT pin The four transmit control registers have a plurality of fields, the fields being illustrated in FIG. 14. The definition of these fields is set forth in the following Table 3.

TABLE 3

T_Control_Reg(0:4) Field Definitions

| Field Mnemonic | Field Width | Field Description |
| --- | --- | --- |
| STES | 2 | Sensor_Transmit_Event_Select |
| SPES | 2 | Sensor_Prefetch_Event_Select |
| MTES | 2 | Manual_Transmit_Event_Select |
| MTE | 1 | Manual_Transmit_Event |
| tl | 6 | transaction label |
| rt | 2 | retry code |
| tcode | 4 | transaction code |
| pri | 4 | priority |
| destination_ID | 16 | address |
| destination_offset_lo | 16 | address |
| destination_offset_hi | 32 | address |
| data_length | 16 | data length used for asynchronous and isochronous transmits |
| DMEN | 2 | Data Mover Enable<br>00 = Automatic asynchronous mode<br>01 = Manual asynchronous mode<br>10 = Automatic isochronous mode<br>11 = Manual isochronous mode |
| Tx_Threshold | 2 | Transmit threshold<br>00 = 2 quadlets (8 bytes)<br>01 = 4 quadlets (16 bytes)<br>10 = 6 quadlets (24 bytes)<br>11 = 8 quadlets (32 bytes) |
| tag | 2 | iso header tag |
| channel | 6 | iso header channel number |
| sy | 4 | iso header syncronization bits |

Isochronous Transmit

Controller 200 can be programmed to transmit isochronous data block packets in much the same way as asynchronous transmits, described hereinabove. When the DMEN field of T_Control_Reg4 is set to Automatic or Manual Isochronous mode, controller 200 will function identically to asynchronous transmit mode except that an isochronous header will be prepended to the packet using information in T_Control Reg3 and T_Control_Reg4.

Host CSR Access

Asserting {10} on HTYPE[1:0] puts controller 200's host interface in CSR access mode. In this mode, the host interface functions as a slave. Internal CSR registers can be written to or read from. Address A[11:0] is used to address the internal 4K CSR space. Cycle Start (CAZ) is an input used to start the transaction. Write (WEZ) is an input used to indicate Write or Read Cycle acknowledge. (CAZ) is asserted by controller 200 to end the transaction. The timing for this operation is illustrated in FIG. 15.

Referring now to FIG. 16, there is illustrated a diagrammatic view of the controller 200 illustrating the various address, data and control pins on the host interface side and the various interfaces with the physical link layer 54. It can be seen that there is provided a 12-bit address bus for the bus 204 and an 8-bit data bus for the bus 206. Table 4 illustrates the various terminal functions.

Referring now to FIG. 18, there is illustrated a timing diagram wherein the quadlet Read request is serviced. The CSZ line will go low after a short delay, followed by the CAZ going low, the CAZ indicating an input cycle acknowledge signal for the input-master transaction. This will be acknowledged to the master, and the address for the Read operation will be placed onto the bus when CSZ goes low, and then data will be placed onto the bus from the peripheral device from the CAZ going low. This data will then be stored in the FIFO 219 and sent to the requesting end as the response.

Figure 19:
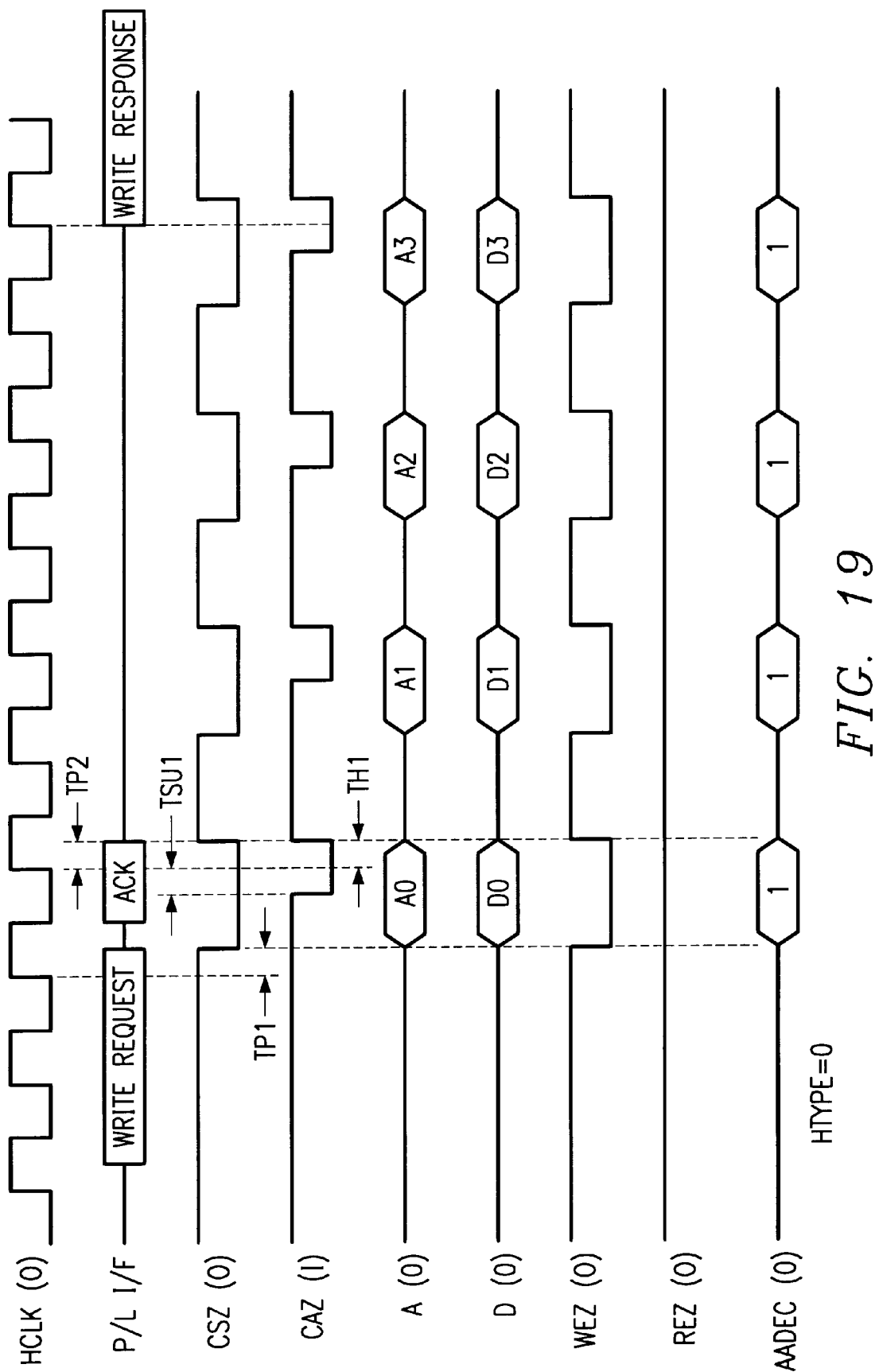
FIG. 19 illustrates a timing diagram for the receipt of a quadlet write request wherein the asynchronous address decode operation is for memory.

Referring now to FIG. 19, there is illustrated a timing diagram for the operation wherein a quadlet Write request

TABLE 4

Terminal Functions

| Signal Name | Pin # | I/O | Description |
|---|---|---|---|
| A[11:0] | | I/O | Address in 8-bit Master and CSR access Host Interface mode. |
| D[7:0] | | I/O | Data in all Host Interface modes. |
| CSZ | | I/O | Output Cycle Start/Chip Select in 8-bit Master mode. Input Cycle Start in CSR access mode |
| CAZ | | I/O | Input Cycle Acknowledge for 8-bit Master transactions. Input Write or Read strobe for 16-bit Slave transactions. Output Cycle Acknowledge for CSR access mode |
| WEZ | | I/O | Output Write indication for 8-bit Master transactions. Input Write indication for CSR access mode |
| REZ | | | |
| HCLK | | O | Host Clock, Programmable using HCLK_SEL<br>00 = SYSCLK<br>01 = SYSCLK/2<br>10 = SYSCLK/4<br>11 = SYSCLK/8 |
| AADEC[1:0] | | O | Asynchronous Address Decode<br>00 = Microcontroller Emulation, Decoded CSR address Micro_M_Reg.<br>01 = Memory, Decoded Initial Memory Space<br>10 = External CSR, Decoded Register Space not in controller 200<br>11 = Internal CSR, Decoded Register Space in controller 200 |
| HTYPE[1:0] | | I | Host Interface Type<br>00 = 8-bit Master<br>controller 200 asserts A (address), CSZ, and WR.<br>D (data) is bidirectional depending on WRZ.<br>External agent uses CAZ to acknowledge transaction.<br>01 = 16-bit Slave<br>Implied address<br>Auto Sequence<br>10 = CSR access mode<br>In this mode, the host interface functions as a slave. Read and Write transactions can be accomplished using A, D, CSZ, CAZ, and WRZ to access the 4K CSR space. |
| TEVENT | | I | Rising edge triggers Sensor_Prefetch_Event<br>Falling edge triggers Sensor_Transmit_Event or Manual_Transmit_Event. |
| D[0:1] | | I/O | Data 0–1 of the phy-link data bus. Data is expected on D[0:1] at 100 Mb/s. D[0] is MS bit. |
| CTL[0:1] | | I/O | Control 0–1 of the phy-link control bus. CTL[0] is MS bit. |
| LREQ | | O | Link request to Phy. This output is used to make bus requests and to access the Phy registers. |
| SYSCLK | | I | System Clock. This input is a 49.152 Mhz from the Phy. |

Figure 17:
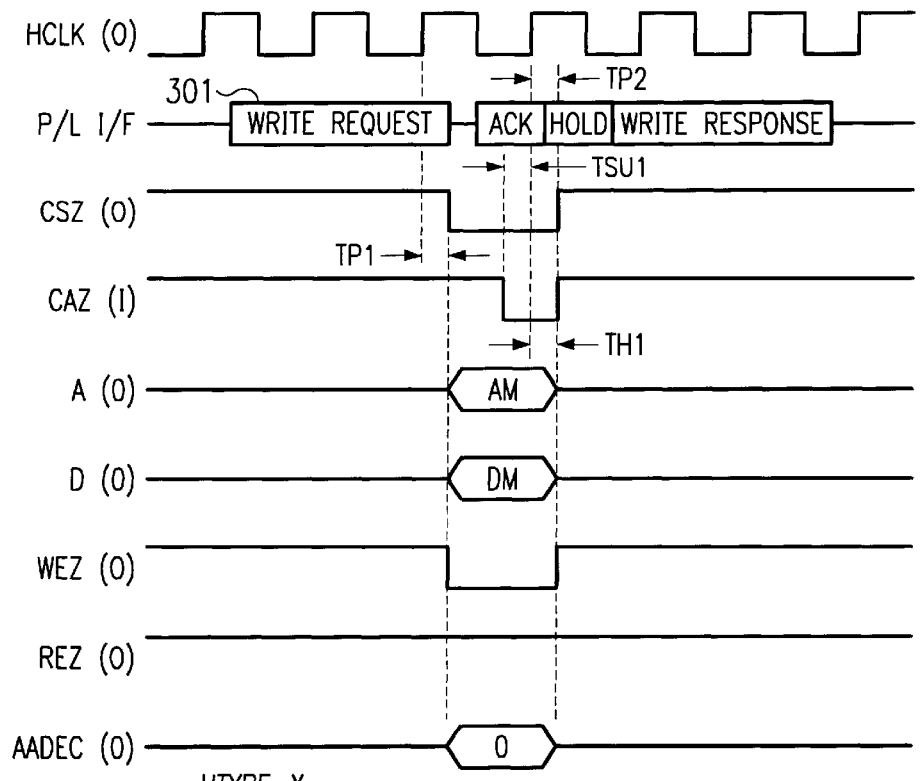
FIG. 17 illustrates a timing diagram for the operation of receiving a quadlet write request.
Figure 18:
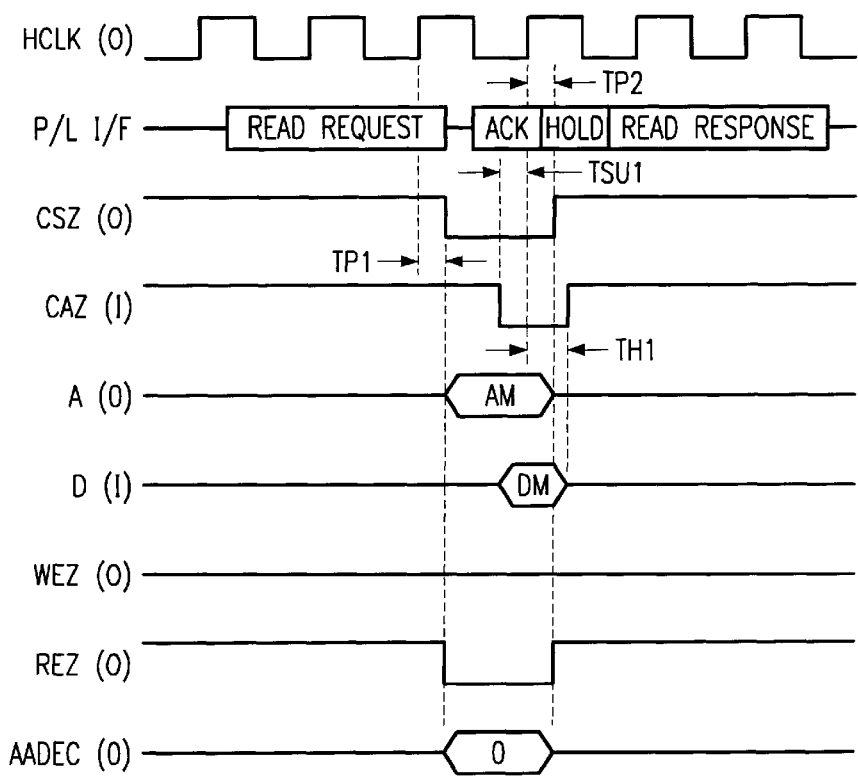
FIG. 18 illustrates a timing diagram for the receipt of a quadlet read request.

Referring now to FIG. 17, there is illustrated a timing diagram for the operation wherein a quadlet Write request was received in the asynchronous mode for interfacing with the host. A Write request is received, as illustrated by block 300. After a short propagation from the rising edge of the clock HCLK, CSZ falls low, indicating the output cycle start/chip select operation. Both the data and the address are decoded and placed onto the address and data buses, and the WEZ line also goes low with the CSZ line, indicating an output Write operation. The AADEC line is set to "0" during this period. While CSZ and WEZ are low, an acknowledgment is sent, followed by a Write response.

has been received in the memory mode. These are block Read or Write requests addressed to the node's initial memory space using the internal FIFO 219. This is similar to SRAM timing in that the block of data will be sequentially processed going low, rising high, and then falling low for three more cycles. This will result in four addresses and associated data being received and written.

Referring now to FIG. 20, there is illustrated a timing diagram depicting a Read request in the memory mode. This operates similar to that described hereinabove with reference to FIG. 19, with the exception that it will be repeated four times, since this is a Read request to initial memory space with byte sized transactions being performed. The appropriate Read response is sent after the FIFO 219 has been filled.

In summary, there has been provided a link/transaction layer controller that. incorporates therein a microcontroller emulator. This microcontroller emulator allows the link/transaction layer to incorporate the operation of a microcontroller therein such that a transmitting node can virtually address the address space of the peripheral device to transmit data thereto during a Write operation and read data therefrom during a Read operation without having to go through a separate microcontroller and the necessary interface transactions. Therefore, the remote transmitting node can directly control the location that is accessed and essentially perform some of the microcontroller operations at the requesting node.

Although the preferred embodiment has been described in detail, it should be understood that various changes, substitutions and alterations can be made therein without departing from the spirit and scope of the invention as defined by the appended claims.

What is claimed is:

1. A serial bus interface disposed on a local node for interfacing between a serial bus and a host system and for receiving information from the serial bus placed thereon by a remote node and transferring this received data to the host system, and receiving information from the host system and transferring the received information to the serial bus for reception by the remote node, comprising:

a data receiver for receiving data generated by the remote node from the serial bus;

a data transmitter for transmitting data to the serial bus for receipt at the remote node;

a plurality of registers, at least one of said registers addressable by the remote node for storage of received data therein;

said data receiver operable to store received data in said at least one register during a Read operation;

said data transmitter for transmitting data to said serial bus during a Write operation; and a host bus interface for interfacing directly with a host bus on the host system, said host bus interface for transferring data stored in said at least one register to the host bus during a Write operation when the data is received and stored in said at least one register and retrieving data from the host bus during a Read operation.

2. The serial bus interface of claim 1, wherein said serial bus interface includes a standard register space, wherein said at least one register occupies a portion of said standard register space.

3. The serial bus interface of claim 1, wherein select ones of said plurality of registers are dedicated to storage of standard bus interface information and wherein a remote node can directly address said plurality of registers associated with said standard bus interface information for access of said information therefrom and wherein said data receiver is operable to recognize a request for access to one of said plurality of registers and said data transmitters are operable to transmit the contents thereof when addressed.

4. The serial bus interface of claim 3, wherein select ones of said plurality of registers comprise configuration registers which said configuration registers are utilized for configuration information that define the operation of the serial bus interface such that a remote node can program the operation of the serial bus interface by accessing one of said configuration registers.

5. The serial bus interface of claim 1, wherein data received by said data receiver comprises data packets and data transmitted by said data transmitter comprises data packets, said data packets comprising information necessary to identify the transmitting node on the serial bus and the content of said data packet and information identifying the remote node designated to receive the data packet.

6. The serial bus interface of claim 5, wherein each data reception or data transmission operation is preceded by a data request, a Write request or a Read request, respectively, from the remote node, which requests are contained in said received data packet, said received data packet associated with a Write request containing the data associated therewith, which data is stored in said at least one register and said host bus interface recognizing the Write request and transferring said data stored in said at least one register to the host bus, and in a Read request, said host bus interface recognizing the said Read request and accessing the data from the host system for transfer to the remote node with said data transmitter.

7. The serial bus interface of claim 6, wherein said Write request from the remote node includes both address and data information for storage in said at least one register and wherein said host bus interface is operable to transmit both the address information and the data information to the host bus, the host bus having an address bus and a data bus.

8. The serial bus interface of claim 6, wherein said Read request from the remote node includes an address which is stored in said at least one register and said host bus interface is operable to transmit said address to the host bus upon recognizing a Read request, the host bus having an address bus and a data bus, and retrieving data from the data bus for transmission to the remote node by said data transmitter.

9. A method for interfacing between a serial bus and a host system on a local node and for receiving information from the serial bus placed thereon by a remote node and transferring this received data to the host system, and receiving information from the host system and transferring the received information to the serial bus for reception by the remote node, comprising the steps of:

receiving with a data receiver data generated by the remote node from the serial bus;

transmitting data to the serial bus for receipt at the remote node;

providing a plurality of registers, at least one of the registers addressable by the remote node for storage of received data therein;

said data receiver operable to store received data in said at least one register during a Read operation;

said data transmitter for transmitting data to said serial bus during a Write operation; and a host bus interface for interfacing directly with a host bus on the host system, said host bus interface for transferring data stored in the at least one register to the host bus during a Write operation when the data is received and stored in the at least one register and retrieving data from the host bus during a Read operation.

10. The method of claim 9, wherein the serial bus interface includes a standard register space, wherein the at least one register occupies a portion of the standard register space.

11. The method of claim 9, wherein select ones of the plurality of registers are dedicated to storage of standard bus interface information and further comprising directly addressing by a remote node the plurality of registers associated with the standard bus interface information for access of the information therefrom and wherein the step of receiving is operable to recognize a request for access to one of the plurality of registers and the step of transmitting is operable to transmit the contents thereof when addressed.

12. The method of claim 11, wherein select ones of the plurality of registers comprise configuration registers which configuration registers are utilized for configuration information that define the operation of the serial bus interface such that a remote node can program the operation of the serial bus interface by accessing one of the configuration registers.

13. The method of claim 9, wherein data received by the step of receiving comprises data packets and data transmitted by the step of transmitting comprises data packets, the data packets comprising information necessary to identify the transmitting node on the serial bus and the content of the data packet and information identifying the remote node designated to receive the data packet.

14. The method of claim 13, wherein each data reception or data transmission operation is preceded by a data request, a Write request or a Read request, respectively, from the remote node, which requests are contained in the received data packet, the received data packet associated with a Write request containing the data associated therewith, which data is stored in the at least one register and the host bus interface recognizing the Write request and transferring the data stored in the at least one register to the host bus, and in a Read request, the host interface recognizing the Read request and accessing the data from the host system for transfer to the remote node in the step of transmitting.

15. The method of claim 14, wherein the Write request from the remote node includes both address and data information for storage in the at least one register and wherein the host bus interface is operable to transmit both the address information and the data information to the host bus, the host bus having an address bus and a data bus.

16. The method of claim 14, wherein the Read request from the remote node includes an address which is stored in the at least one register and the host bus interface is operable to transmit the address to the host bus upon recognizing a Read request, the host bus having an address bus and a data bus, and retrieving data from the data bus for transmission to the remote node by the data transmitter.

* * * * *